(12) United States Patent
Sabo et al.

(10) Patent No.: US 10,767,756 B2
(45) Date of Patent: Sep. 8, 2020

(54) METHODS OF FORMING COMPONENTS UTILIZING ULTRA-HIGH STRENGTH STEEL AND COMPONENTS FORMED THEREBY

(71) Applicant: Magna Powertrain Inc., Concord (CA)

(72) Inventors: John Richard Sabo, Caledon (CA); Sokol Sulaj, Etobicoke (CA)

(73) Assignee: MAGNA POWERTRAIN INC., Concord (CA)

( * ) Notice: Subject to any disclaimer, the term of this patent is extended or adjusted under 35 U.S.C. 154(b) by 877 days.

(21) Appl. No.: 15/291,394

(22) Filed: Oct. 12, 2016

(65) Prior Publication Data
US 2017/0102067 A1    Apr. 13, 2017

Related U.S. Application Data

(60) Provisional application No. 62/240,952, filed on Oct. 13, 2015.

(51) Int. Cl.
*B21D 53/88* (2006.01)
*F16H 57/08* (2006.01)
(Continued)

(52) U.S. Cl.
CPC ......... *F16H 57/082* (2013.01); *B21D 22/022* (2013.01); *B21D 53/28* (2013.01);
(Continued)

(58) Field of Classification Search
CPC .... B21D 22/022; B21D 22/06; B21D 22/208; B21D 22/22; B21D 22/26; B21D 53/34;
(Continued)

(56) References Cited

U.S. PATENT DOCUMENTS 4,356,717 A * 11/1982 Okunishi ................. B21K 1/32
72/334
4,824,492 A    4/1989 Wright
(Continued)

FOREIGN PATENT DOCUMENTS

CN    101450362 A    6/2009
CN    101619383 A    1/2010
(Continued)

OTHER PUBLICATIONS

Search Reported dated May 27, 2019 in corresponding Chinese Patent Application No. 201680059858.2.
(Continued)

*Primary Examiner* — Edward T Tolan
(74) *Attorney, Agent, or Firm* — Dickinson Wright PLLC

(57) ABSTRACT

A component and method for forming the component utilizing ultra-high strength steel is provided. The method includes the steps of providing a blank of ultra-high strength steel and forming the blank into an unfinished component. Next, heating the unfinished component and moving an inner tooling member and an outer tooling member relative to one another to sandwich the heated component therebetween. Further, moving a punch member from a withdrawn, unactuated position to an extended, actuated position to contact the component while sandwiched between the inner and outer tooling members to form a feature including at least one of a thickened region having an increased thickness relative to an adjacent region, a recessed annular groove, a recessed pocket, a through hole, a flange, a through hole having a tab extending outwardly therefrom, or spline teeth. Then, quenching the feature.

21 Claims, 21 Drawing Sheets

(51) Int. Cl.

| | | |
|---|---|---|
| F16D 13/68 | (2006.01) | |
| B21D 53/34 | (2006.01) | |
| F16H 41/28 | (2006.01) | |
| B21D 53/28 | (2006.01) | |
| B21D 22/02 | (2006.01) | |
| F01M 11/00 | (2006.01) | |
| F16D 13/58 | (2006.01) | |
| F16H 41/24 | (2006.01) | |
| F16H 45/02 | (2006.01) | |
| F16H 57/037 | (2012.01) | |
| F16H 57/04 | (2010.01) | |
| F16H 48/08 | (2006.01) | |
| B21K 1/26 | (2006.01) | |
| F16H 48/40 | (2012.01) | |

(52) U.S. Cl.
CPC ............ *B21D 53/34* (2013.01); *B21D 53/88* (2013.01); *F01M 11/0004* (2013.01); *F16D 13/58* (2013.01); *F16D 13/683* (2013.01); *F16H 41/24* (2013.01); *F16H 41/28* (2013.01); *F16H 45/02* (2013.01); *F16H 57/037* (2013.01); *F16H 57/0452* (2013.01); *B21K 1/26* (2013.01); *F01M 2011/0054* (2013.01); *F01M 2011/0091* (2013.01); *F16D 2200/0021* (2013.01); *F16D 2250/0023* (2013.01); *F16D 2300/26* (2013.01); *F16H 48/08* (2013.01); *F16H 48/40* (2013.01)

(58) Field of Classification Search
CPC ........ B21D 22/21; B21D 22/30; B21D 37/16; B21D 53/88; C21D 1/673
See application file for complete search history.

(56) References Cited

U.S. PATENT DOCUMENTS

| | | | | |
|---|---|---|---|---|
| 6,878,220 | B2 | 4/2005 | Gehringhoff et al. | |
| 7,197,908 | B2 * | 4/2007 | Oki | B21D 53/28 |
| | | | | 72/348 |
| 7,559,998 | B2 | 7/2009 | Nishibata et al. | |
| 7,998,289 | B2 * | 8/2011 | Brodt | B21D 35/00 |
| | | | | 148/567 |
| 8,127,449 | B2 | 3/2012 | Bayer et al. | |
| 8,141,230 | B2 * | 3/2012 | Brodt | B21D 35/00 |
| | | | | 148/647 |
| 8,257,516 | B2 * | 9/2012 | Im | B21D 35/00 |
| | | | | 148/647 |
| 8,261,591 | B2 * | 9/2012 | Hielscher | B21D 24/16 |
| | | | | 72/334 |
| 9,132,464 | B2 * | 9/2015 | Takacs | C21D 1/673 |
| 9,242,287 | B2 * | 1/2016 | Fang | B21D 24/16 |
| 9,308,953 | B2 * | 4/2016 | Arns | B21D 53/88 |
| 2003/0066581 | A1 * | 4/2003 | Gehringhoff | C21D 1/673 |
| | | | | 148/624 |
| 2007/0175040 | A1 | 8/2007 | Bayer et al. | |
| 2009/0211669 | A1 * | 8/2009 | Vehof | B21D 22/26 |
| | | | | 148/654 |
| 2009/0238715 | A1 * | 9/2009 | Cho | C21D 1/48 |
| | | | | 420/89 |
| 2012/0260784 | A1 * | 10/2012 | Saito | B21D 22/208 |
| | | | | 83/15 |

FOREIGN PATENT DOCUMENTS

| | | |
|---|---|---|
| CN | 101896293 A | 11/2010 |
| CN | 102806259 A | 12/2012 |
| CN | 104923605 A | 9/2015 |
| WO | 1490535 A | 11/1977 |
| WO | WO2015143537 A1 | 10/2015 |

OTHER PUBLICATIONS

H. Karbasian et al., "A review of hot stamping", Journal of Materials Processing Technology; vol. 210, No. 15; Nov. 19, 2010; pp. 2103-2118.

K. Mori et al., "Hot Spline Forming of Ultra-High Strength Steel Gear Drum Using Resistance Heating"; Key Engineering Materials; vols. 622-623; Sep. 2014; pp. 201-206.

K. Mori et al., "Spline forming of ultra-high strength gear drum using resistance heating of side wall of cup"; CIRP Annals—Manufacturing Technology; vol. 60, No. 1; Dec. 31, 2011; pp. 299-302.

H. So et al., "An investigation of the blanking process of the quenchable boron alloyed steel 22MnB5 before and after hot stamping process"; Journal of Materials Processing Technology; vol. 212, No. 2; Feb. 29, 2012; pp. 437-449.

L. Wei et al., "Effect of tool temperature and punch speed on hot stamping of ultra high strength steel", Transactions of Nonferrous Metals Society of China; vol. 22 (2012); pp. 534-541.

International Search Report and Written Opinion dated Jan. 16, 2017 in corresponding International Patent Application No. PCT/CA2016/000257.

Search Report dated Nov. 27, 2018 from corresponding Chinese Patent Application No. 201680059858.2.

A. Naganathan et al., "Sheet Metal Forming—Processes and Applications", Chapter 7—Hot Stamping; ASM International (2012); pp. 133-156.

K. Mori, "Smart Hot Stamping of Ultra-High Strength Steel Parts"; Science Direct; Trans. Nonferrous. Met. Soc. China; vol. 22, No. 2; Dec. 2012; pp. 496-503.

T. Altan, "R & D Update: Hot-Stamping Boron-Alloyed Steels for Automotive Parts—Part II"; Stamping Journal (2007); Available on-line at http:/www.thefabricator.com/article/stamping/hot-stamping-boron-alloyed-steels-for-automotive-parts—parts-ii.

T. Maeno et al., "Hot Spline Forming of Ultra High Strength Steel Gear Drum Using Resistance Heating"; Journal of the Japan Society for Technology of Plasticity; vol. 52; No. 601; Feb. 2011; pp. 277-281.

* cited by examiner

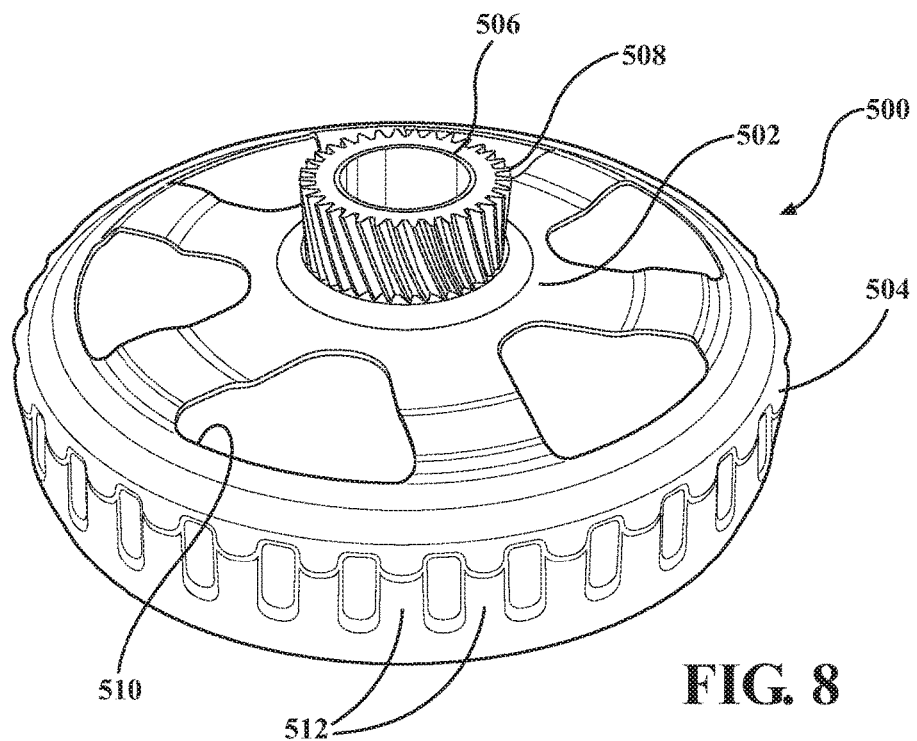
FIG. 8
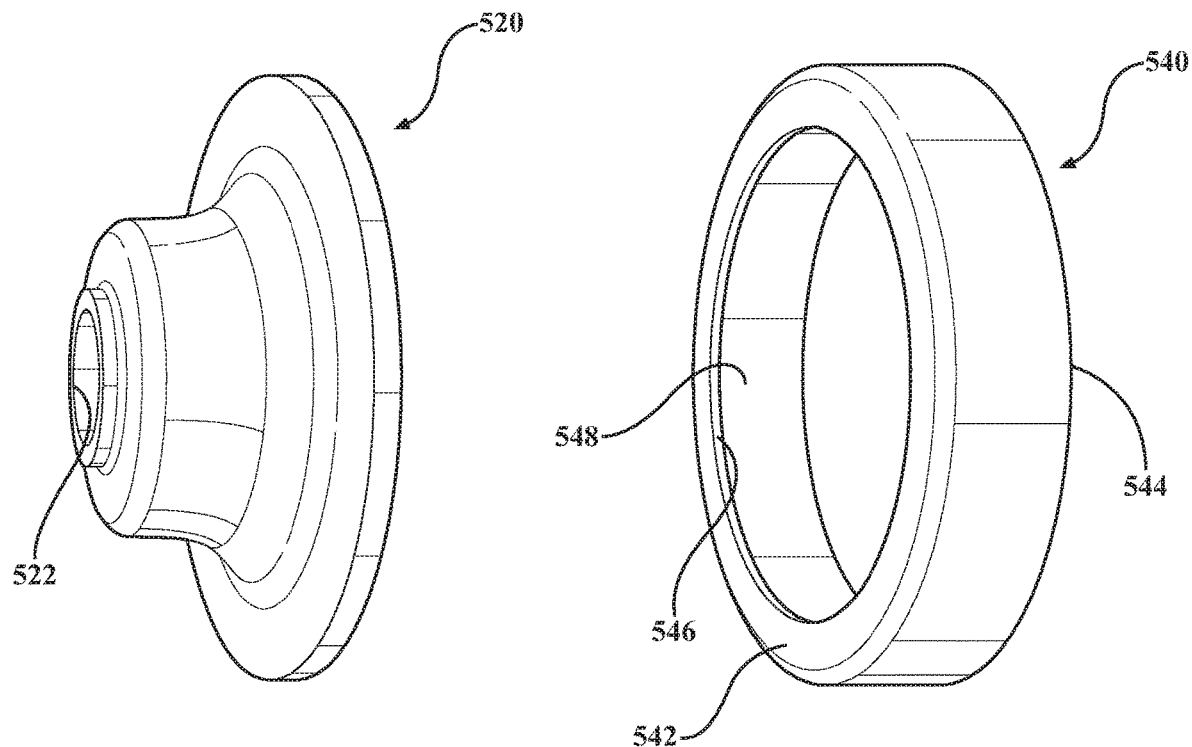
FIG. 9
FIG. 10

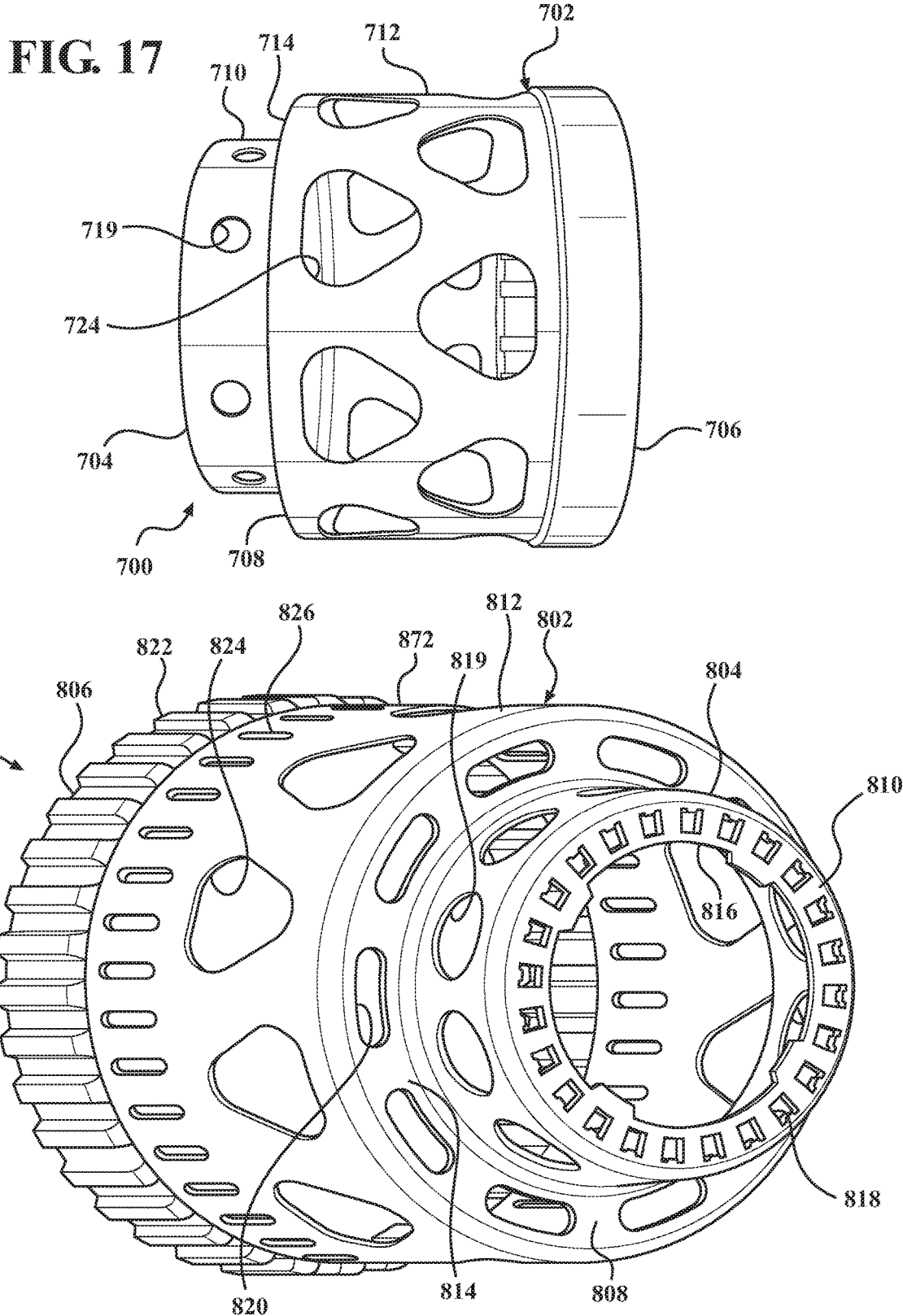

METHODS OF FORMING COMPONENTS UTILIZING ULTRA-HIGH STRENGTH STEEL AND COMPONENTS FORMED THEREBY

CROSS REFERENCE TO RELATED APPLICATIONS

This application claims the benefit of, and priority to, U.S. Provisional Application Ser. No. 62/240,952 filed Oct. 13, 2015, the entire disclosure of which is incorporated herein by reference.

FIELD

The present disclosure relates generally to methods of forming components from ultra-high strength steel, such as boron steel, and to components formed by such methods.

BACKGROUND

Ultra-high strength steel is currently used in building construction and static automotive structures (e.g. vehicle bodies and frames). The use of ultra-high strength steel generally allows the weights of these structures to be reduced. Additionally, in automotive structures, the ultra-high strength steel enables the absorption of impact energy and minimizes intrusion into occupant seating areas. Although ultra-high strength steel can be made extremely strong, other properties such as formability, weldability, and impact toughness may be negatively affected, resulting in structures which may be more prone to cracking and fracture.

Power transmission components for automotive vehicles, such as clutch assemblies having clutch plates within a clutch housing and clutch hub are well-known. Such clutch housings have a generally cylindrical or cup-shaped body and an open end. The cylindrical or cup-shaped body is formed from a sheet metal blank and has a plurality of spline teeth formed thereon. The clutch plates fit within the clutch housing and engage the spline teeth. The clutch hub can also be a formed sheet metal component and is typically connected to a transmission shaft.

Powertrain components including clutch housings and hubs are commonly made of aluminum or high strength low alloy steel (HSLA) rather than ultra-high strength steel, such as boron steel. Aluminum or HSLA steel is used primarily because of its formability. Specifically, these types of materials are high strength materials which can achieve a specific geometric dimension or shape and have a specific tolerance required. Consequently, aluminum or HSLA may be used in powertrain components including parts of an automatic transmission easily, efficiently, and at a low-cost.

Typically, components such as reaction shells, clutch housings, and hubs made of aluminum or HSLA are formed using one or a combination of cold-forming or stamping processes and thermal heat treatments to obtain the desired shape, performance, and strength characteristics. Additionally, the structures such as the plurality of spline teeth of the clutch housing may be formed easily by using a series of rollers. Similar processes also may be used to form other powertrain components such as planetary carriers used in differentials and various covers used in a vehicle powertrain.

Ultra-high strength steel lacks formability using the conventional cold-forming technologies discussed above. Use of conventional cold-forming technologies with ultra-high strength steel typically does not result in the formation of required geometric dimensions and tolerances. However, there is a desire by manufacturers and suppliers to utilize ultra-high strength steel in forming automotive components such as power transmission components for similar reasons as those discussed above when used in static applications of automotive structures (e.g. reduced component weight and improved absorption of impact energy).

As such, a need exists for components, such as clutch housings and hubs, to be formed from ultra-high strength steel, such as boron steel. Additionally, there is a need for an improved method for forming the same.

SUMMARY

This section provides a general summary of the inventive concepts associated with the present disclosure and is not intended to represent a comprehensive disclosure of its full scope or all of its features, object, aspects and advantages. Components formed with ultra-high strength steel and methods of forming these components from ultra-high strength steel are provided.

In accordance with one aspect of the disclosure, a method for forming components from ultra-high strength steel includes pre-forming, such as via cold-forming, a blank of ultra-high strength steel, such as a flat blank of ultra-high strength steel, into a predetermined shape. The predetermined shape may be a cylindrical or generally cup-shaped. The step of cold-forming the flat blank may include forming a plurality of spline teeth along the blank of steel. The method may also include heat treating the blank of steel, such as in an inert atmosphere. The inert atmosphere may be an induction oven or an induction chamber. Additionally, the heat treating may be partially or completely localized. The method further includes quenching the heat treated blank of steel. Quenching may include forming a plurality of spline teeth along the blank of steel or finalizing the predetermined form using a water cooled quenching die.

In accordance with another aspect of present disclosure, a method for forming a component utilizing ultra-high strength steel is provided. The method includes the steps of providing a blank of ultra-high strength steel and forming the blank into an unfinished component. Next, the method includes the steps of heating the unfinished component and moving an inner tooling member and an outer tooling member relative to one another to sandwich the heated component therebetween. Further yet, moving a punch member from a withdrawn, unactuated position to an extended, actuated position to contact the component while sandwiched between the inner and outer tooling members to form a feature including at least one of a thickened region having an increased thickness relative to an adjacent region, a recessed annular groove, a recessed pocket, a through hole, a flange, a through hole having a tab extending outwardly therefrom, or spline teeth. Then, the method further includes quenching the feature.

In accordance with another aspect of present disclosure, the method can further include maintaining the inner tooling member in a stationary position and moving the outer tooling member from a withdrawn, unactuated position to an extended, actuated position to sandwich the heated component therebetween.

In accordance with another aspect of present disclosure, the method can further include moving the punch member from the extended, actuated position back to the withdrawn, unactuated position prior to quenching the feature.

In accordance with another aspect of present disclosure, the method can further include quenching the feature while the punch member is in the extended, actuated position.

In accordance with another aspect of present disclosure, the method can further include maintaining the outer tooling member in a stationary position and moving the inner tooling member from a withdrawn, unactuated position to an extended, actuated position to sandwich the heated component therebetween, and then, either moving the punch member from the extended, actuated position back to the withdrawn, unactuated position and then quenching the feature or quenching the feature while the punch member is in the extended, actuated position.

In accordance with another aspect of present disclosure, the method can further include moving both the inner and outer tooling members from a withdrawn, unactuated position to an extended, actuated position to sandwich the heated component therebetween.

In accordance with another aspect of present disclosure, the method can further include heating the unfinished component in an inert atmosphere prior to performing subsequent forming steps.

In accordance with another aspect of present disclosure, the method can further include heating the unfinished component in an inert atmosphere between 850 degrees Celsius and 950 degrees Celsius.

In accordance with another aspect of present disclosure, the method can further include quenching the feature to a temperature between 150 degrees Celsius and 250 degrees Celsius.

In accordance with another aspect of present disclosure, the method can further include providing the blank of ultra-high strength steel of the 22MnB5 ultra high strength steel type.

In accordance with another aspect of present disclosure, the method can further include forming the blank into a generally cylindrical clutch housing having a radial ring portion and a cylindrical drum portion and forming a plurality of spline teeth in the cylindrical drum portion of the clutch housing with the punch member and inner and outer tooling members.

In accordance with this exemplary embodiment of the present disclosure, a method for forming the clutch housing from ultra-high strength steel can include cold-forming the body of the clutch housing, heat treating in an inert atmosphere, and quenching using a water cooled quenching die to form and finalize the cylindrical or cup-shaped body. The ultra-high strength steel forming the body of the clutch housing may be boron steel.

In accordance with another aspect of present disclosure, the method can further include forming the blank into a clutch hub having a radial ring portion and a generally cylindrical drum portion and further including a tubular neck and forming a plurality of generally triangular openings in the radial ring portion and forming a plurality of spline teeth in the cylindrical drum portion with the punch member and inner and outer tooling members and attaching a drive gear to the tubular neck.

In accordance with another aspect of present disclosure, the method can further include forming the blank into a CVT plunger and forming the unfinished component having a relatively thickened center region and a thick outer edge region and forming the finished shape of a generally bell-shaped body providing a centrally disposed opening with the punch member and inner and outer tooling members.

In accordance with another aspect of present disclosure, the method can further include forming the blank into a CVT cylinder having a first end and a second end and a shoulder formed at the first end and an opening longitudinally extending from the first end to the second end.

In accordance with another aspect of present disclosure, the method can further include forming the blank into a planetary carrier having a first piece and a second piece and is further forming the first piece into the unfinished shape with a plurality of apertures circumferentially disposed in a spaced relation about the first piece and including a plurality of legs extending longitudinally and forming the second piece into the unfinished shape with a plurality of apertures circumferentially disposed in a spaced relation about the second piece and joining the first piece with the second piece after forming the finished shape of the first piece and the finished shape of the second piece using the punch member and inner and outer tooling members.

In accordance with another aspect of present disclosure, the method can further include forming the blank into a reaction shell having a cylindrical first portion of a first diameter and a cylindrical second portion of a second diameter larger than the first diameter and forming a plurality of bores in the cylindrical first portion and in the cylindrical second portion and forming a plurality of radially outwardly extending spline teeth in the cylindrical second portion of the reaction shell using the punch member and inner and outer tooling members.

In accordance with another aspect of present disclosure, the method can further include forming the blank into a differential housing having a drum shape with a tubular neck portion providing a central opening and including a plurality of arms extending radially and longitudinally from the neck portion, wherein the arms alternate circumferentially between the arm including a radially inwardly extending shoulder and the arm having a generally L-shaped cross section and forming at least one aperture in each of the arms.

In accordance with another aspect of present disclosure, the method can further include forming the blank into a differential cover for enclosing a plurality of pinion gears having a bell-shaped body extending between a generally cylindrical first end and an opposite annular second end and attaching a ring gear to the tubular neck following forming the finished shape using the punch member and inner and outer tooling members.

In accordance with another aspect of present disclosure, the method can further include forming the blank into a torque converter cover having a front portion with a general drum shape including a radial wall having an outer peripheral portion providing a lock-up surface and an integral cylindrical portion having an inner surface extending longitudinally from the radial wall and a back portion having a ring shape with a center opening and a curved cross section and forming a plurality of spline teeth in the inner surface of the front portion using the punch member and inner and outer tooling members while forming the finished shape of the front portion.

In accordance with another aspect of present disclosure, the method can further include forming the blank into an oil pan by forming the unfinished component into a generally rectangular base with a side wall disposed around a periphery of the base and extending generally perpendicularly from the base to an upper continuous flange adapted to be secured to a block of an engine and forming a plurality of openings in the flange, spaced from each other circumferentially about the flange, using the punch member and inner and outer tooling members.

In accordance with an aspect of present disclosure, a relatively light weight, high strength component of ultra-high strength steel is provided, wherein the component takes on the configuration of any one of the components disclosed herein by performing the method of construction steps using the punch member and inner and outer tooling members on a blank of ultra-high strength steel.

In accordance with an exemplary embodiment of a component constructed in accordance with the present disclosure, a clutch housing is provided. The clutch housing has a cylindrical or cup-shaped body and an open end.

In accordance with another embodiment of a component constructed in accordance with the present disclosure, a clutch hub is provided. The clutch hub has a cup-shaped body and an open end.

In accordance with another embodiment of a component constructed in accordance with the present disclosure, a continuously variable transmission (CVT) plunger is provided. The CVT plunger includes a generally bell-shaped body defining a centrally disposed opening.

In accordance with another embodiment of a component constructed in accordance with the present disclosure, a CVT cylinder is provided. The CVT cylinder includes an annular or cylindrically shaped body having a first end and a second end and including a shoulder formed at the first end.

In accordance with another embodiment of a component constructed in accordance with the present disclosure, a planetary gear carrier is provided. The planetary gear carrier comprises a first piece and a second piece joined together by a weld. The first piece includes a plurality of legs extending longitudinally. A plurality of apertures is circumferentially disposed in a spaced relation to each other about the perimeter of each piece.

In accordance with another embodiment of a component constructed in accordance with the present disclosure, a reaction shell is provided. The reaction shell comprises a body including a cylindrical first portion having a first diameter and a cylindrical second portion having a second diameter larger than the first diameter. A plurality of radially outwardly extending spline teeth is disposed about the cylindrical second portion.

In accordance with another embodiment of a component constructed in accordance with the present disclosure, a differential housing is provided. The differential housing is generally cup or drum shaped with a tubular neck portion providing a central opening with a plurality of arms extending radially and longitudinally from the neck portion.

In accordance with another embodiment of a component constructed in accordance with the present disclosure, a differential cover is provided. The differential cover comprises a generally bell shaped body extending between a generally cylindrical first end and an opposite annular second end. A ring gear is attached to the second end of the cover.

In accordance with another embodiment of a component constructed in accordance with the present disclosure, a torque converter cover is provided. The torque converter cover comprises a front portion and a back portion. The front portion is generally drum-shaped and includes a radial wall and an integral cylindrical portion with an inner surface that extends longitudinally from the radial wall. The back portion is ring shaped and has a center opening and a curved cross-section or half round shape.

In accordance with another embodiment of a component constructed in accordance with the present disclosure, an oil pan is provided. The oil pan comprises a generally rectangular base with a side wall disposed around the periphery of the base and extending generally perpendicularly from the base to an upper continuous flange adapted to be secured under the block of an engine.

In accordance with an aspect of the disclosure, methods of forming features of a component are also provided.

The aspects disclosed herein provide various advantages. For example, the components are more lightweight as a result of a reduced cross section resulting from increased material strength than conventional components using HSLA steel. The components have increased tolerance from using ultra-high strength steel than conventional components. The method is more cost efficient and reduces cost due to reduced or unnecessary component trimming as a result of using water cooled quenching unlike the conventional methods which require additional trimming such as laser trimming. In other words, die wear is reduced and maintenance schedules are less frequent as a result of the resulting lower cutting forces from using water cooled quenching. Additionally, there is an improved component reliability due to the reduction of crack initiations due to soft component trimming and an increased manufacturing flexibility using localized induction heating.

DRAWINGS

Other advantages of the present disclosure will be readily appreciated, as the same becomes better understood by reference to the following detailed description when considered in connection with the accompanying drawings wherein:

FIG. 8 is a perspective view of a clutch hub in accordance with another embodiment of the present disclosure;

FIG. 9 is a perspective view of a continuously variable transmission (CVT) plunger in accordance with another embodiment of the present disclosure;

FIG. 10 is a perspective view of a CVT cylinder in accordance with another embodiment of the present disclosure;

FIG. 17 is a side view of a first reaction shell constructed in accordance with another aspect of the disclosure;

FIG. 18A is a perspective view of a second reaction shell constructed in accordance with another aspect of the disclosure;

DETAILED DESCRIPTION

Detailed examples of the present disclosure are disclosed herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects disclosed herein include components made of ultra-high strength steel and a method of forming components utilizing ultra-high strength steel. In particular, the components may be for example, lightweight automatic clutch hubs and housings, planetary gear carriers, or torque convertor covers made of boron steel and cold formed in their unhardened state to near net-shape via an "indirect method" and finished sized i.e. net-shaped via heat assisted calibration (HAC) to achieve 40 to 60% mass reduction of rotating inertia. According to an aspect, the lightweight pre-formed boron steel components (with or without a plurality of spline teeth) are subsequently heated in an inert atmosphere and rapidly transferred to a water-cooled quenching die to minimize oxidation and resulting in a fine-grained martensitic component material structure. The die quenching tool enables net shape processing within geometric dimensions and tolerance requirements.

As those of ordinary skill in the art will understand various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Example embodiments of components formed from ultra-high strength steel constructed in accordance with the present disclosure will now be more fully described. These example embodiments are primarily directed to powertrain components. Moreover, each of the exemplary embodiments is provided so that this disclosure is thorough and fully conveys the scope of the inventive concepts, features and advantages to those skilled in the art. To this end, numerous specific details are set forth to provide a thorough understanding of each of the embodiments associated with the present disclosure. However, as will be apparent to those skilled in the art, not all specific details described herein need to be employed, the example embodiments may be embodied in many different forms, and that neither should be construed nor interpreted to limit the scope of the disclosure.

Figure 1:
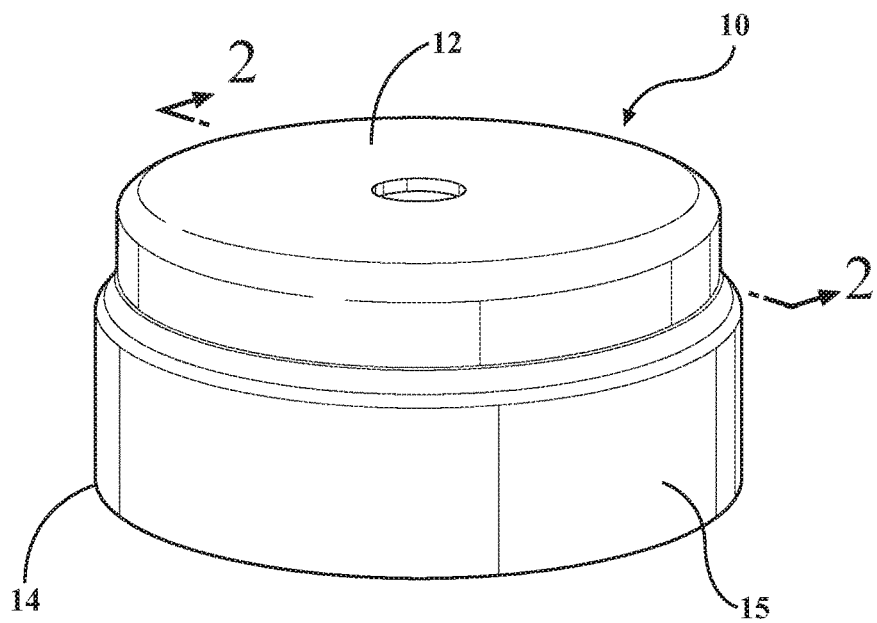
FIG. 1 is a perspective view of a clutch housing and a clutch hub in accordance with an exemplary embodiment of the present disclosure.
Figure 2:
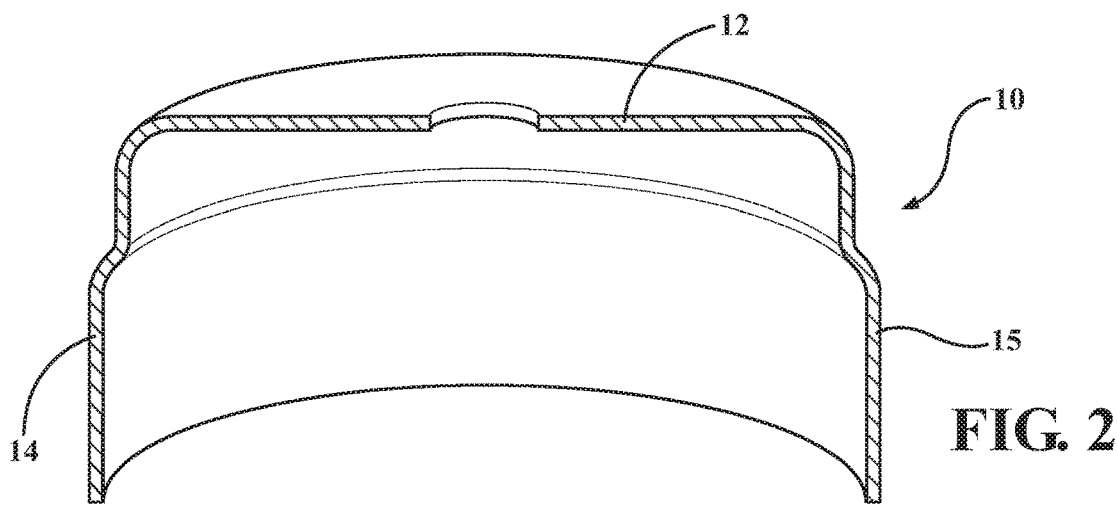
FIG. 2 is a cross-sectional view along 2-2 of FIG. 1.
Figure 3:
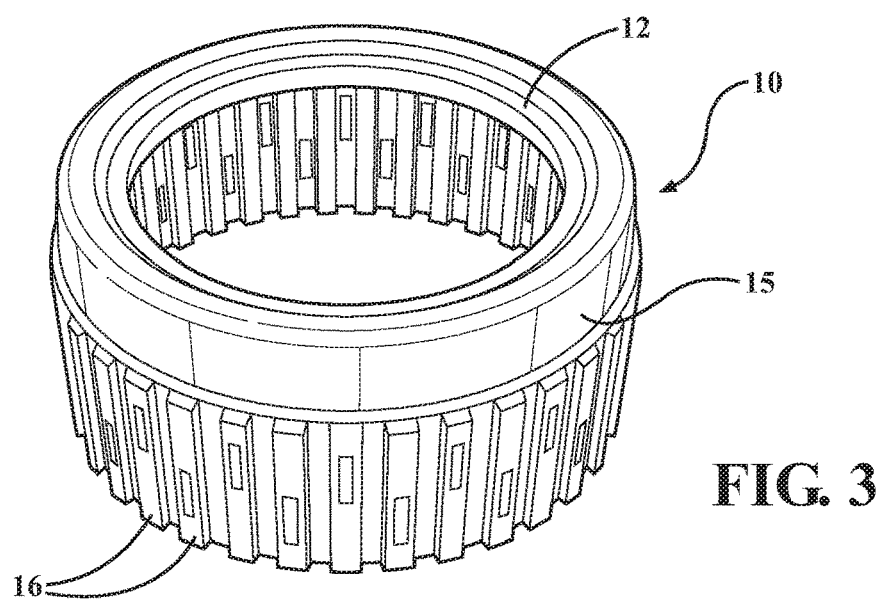
FIG. 3 is a perspective view of a clutch housing having a plurality of spline teeth for engaging a clutch plate in accordance with the exemplary embodiment of the present disclosure.

FIGS. 1-3 show various views of a clutch housing 10 in accordance with an exemplary embodiment of the present disclosure. In particular, FIG. 1 shows a perspective view of a clutch housing 10, FIG. 2 shows a cross-sectional view of the clutch housing 10 and hub 12, and FIG. 3 shows a perspective view of the clutch housing 10 having a plurality of spline teeth 16 disposed thereon. In FIGS. 1 and 2, the clutch housing 10 is shown without the plurality of spline teeth 16. The clutch housing 10 has a generally cylindrical or cup-like shape having a radial ring portion 12 and a cylindrical drum portion 15. Housing 10 is formed from a strip (i.e. blank) of ultra-high strength steel 14, one preferred type of ultra-high strength steel 14 includes 22MnB5 boron steel. The ultra-high strength steel may be pre-coated with aluminum silicon (AlSi) or other material to prevent corrosion and decarburization during the heating and quenching steps. The clutch housing 10 may be a single piece or may be two pieces joined together by a weld or may be pressed-formed. To form the clutch housing 10, a blank of boron steel 14 is preformed, specifically cold-formed, into a predetermined shape. The predetermined shape may be a cylindrical shape or any shape known in the art related for clutch housings. After the blank 14 is cold-formed into a predetermined shape, the predetermined shape is heat treated in an inert environment. The inert environment may be an induction oven or induction chamber. Heat treatment may include, but is not limited to, any or a combination of annealing, case hardening, tempering, quenching, hot forming, or welding. Next, the clutch housing 10 is exposed to a water cooled quenching tool die to form a plurality of spline teeth 16 thereon, as shown in FIG. 3. Alternatively, the water cooled quenching die may form a second predetermined shape instead of a plurality of spline teeth 16, as shown in FIGS. 1-2 where the clutch housing 10 is smooth. It is important to note in FIG. 2 that the cross-sectional view shows a reduction in materials used compared to conventional methods using HSLA steel. A clutch hub may be formed in the same manner as will be described further below.

Figure 4:
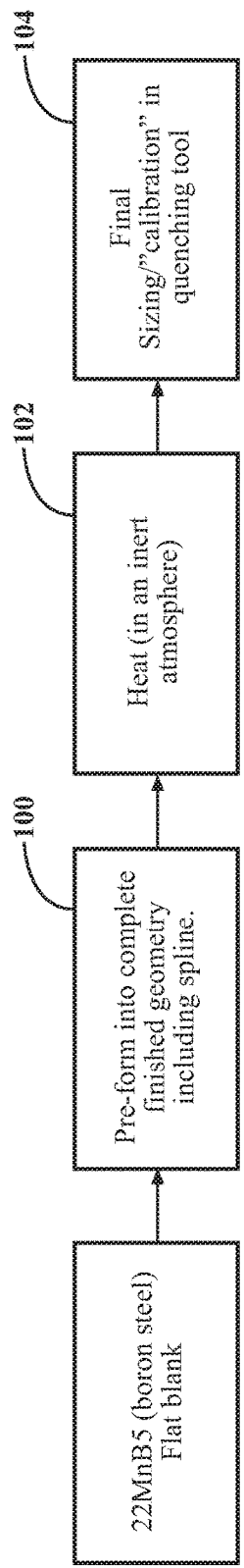
FIG. 4 is a flowchart of a method for forming a power transmission component utilizing ultra-high strength steel in accordance with the exemplary embodiment of the present disclosure.

With respect to FIG. 4, a flowchart of a method for forming a component utilizing ultra-high strength steel in accordance with the exemplary embodiment of the present disclosure is provided. As illustrated by additional embodiments described in more detail below, the component may be, but is not limited to, a clutch housing, clutch hub, planetary gear carrier, or a torque converter cover. In the exemplary embodiment, the component is the clutch housing 10 described above. First, the method includes the 100 pre-forming a flat blank of steel into a predetermined shape having a plurality of spline teeth 16. Specifically, the pre-forming of the flat blank of steel is carried out by cold-forming techniques. The predetermined or unfinished shape is based on the type of component. For example, if the component is a clutch housing 10, the steel may be cold-formed into a cylindrical or cup-like shape. The flat blank of steel may be 22MnB5 boron steel and may be pre-coated to prevent corrosion. After the flat blank of steel has been pre-formed into a predetermined shape with the plurality of spline teeth 16, the pre-formed predetermined shape is 102 heat treated in an inert atmosphere to alter the properties of the steel. The heat treated steel is then sized and calibrated using a quenching tool 104. In particular, a water cooled quenching die.

Figure 5:
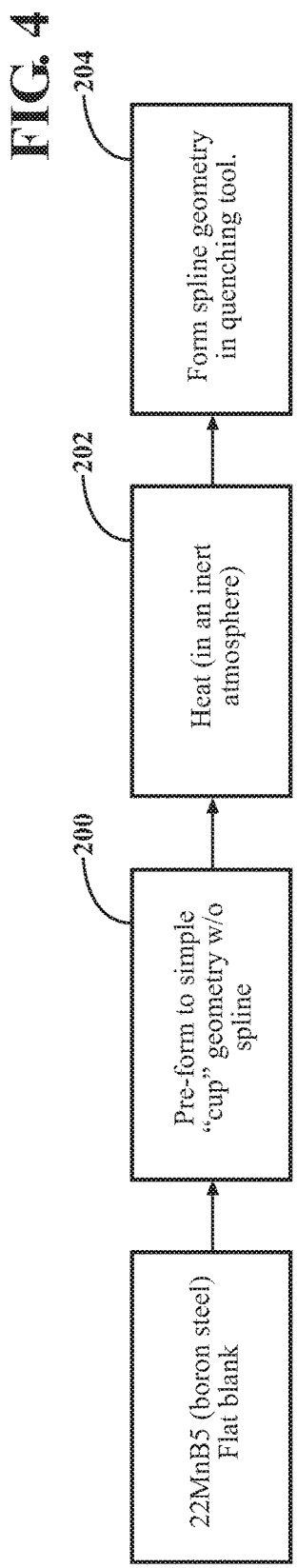
FIG. 5 is a flowchart of a method for forming a power transmission component utilizing ultra-high strength steel in accordance with the exemplary embodiment of the present disclosure.

With respect to FIG. 5, a flowchart with a method for forming a component utilizing ultra-high strength steel in accordance with the exemplary embodiment of the present disclosure is provided. The method includes 200 pre-forming a flat blank of steel into a cup-shaped body. As discussed above, the flat blank of steel may be a 22MnB5 boron steel blank. The cup-shaped body is then 202 heat treated in an inert environment. The inert environment may be an induction chamber or oven. Next, the method includes 204 water cooled quenching the cup-shape body to form a plurality of spline teeth thereon.

Figure 6:
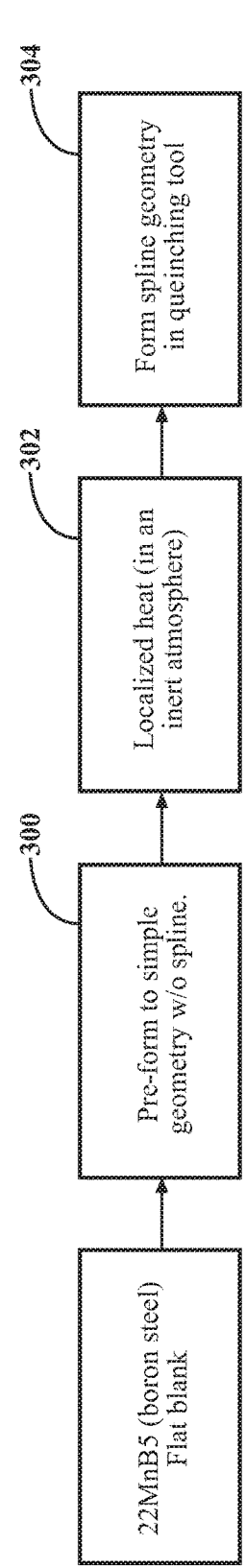
FIG. 6 is a flowchart of a method for forming a power transmission component utilizing ultra-high strength steel in accordance with the exemplary embodiment of the present disclosure.
Figure 7:
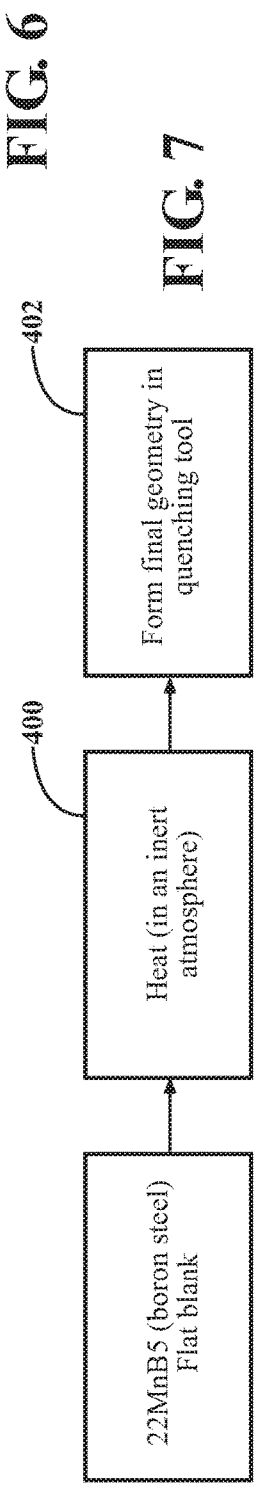
FIG. 7 is a flowchart of a method for forming a power transmission component utilizing ultra-high strength steel in accordance with the exemplary embodiment of the present disclosure.

FIGS. 6-7 also show flowcharts of methods for forming a component utilizing ultra-high strength steel in accordance with the exemplary embodiment of the present disclosure. Like the methods shown in FIGS. 4-5, the methods shown in FIGS. 6-7 utilize 22MnB5 boron steel. However, it is appreciated by one skilled in the art that any type of ultra-high strength steel or any type of boron steel may be used in conjunction with these methods. In FIG. 6, the method includes 300 pre-forming or cold-forming the flat blank of steel into a predetermined shape. The predetermined or unfinished shape of the method shown in FIG. 6 does not include a plurality of spline teeth 16. The cold-formed steel is then 302 heat treated in an inert atmosphere. The heat treatment may be localized to a certain portion of the steel. The method further includes 304 forming a plurality of spline teeth 16 within the heat treated steel using a quenching tool. The quenching tool is a water-cooled quenching die.

With respect to FIG. 7, the method for forming a component utilizing ultra-high strength steel in accordance with the exemplary embodiment of the present disclosure includes 400 heat treating a flat blank of steel in an inert atmosphere and 402 quenching the heat treated flat blank into a predetermined shape using a quenching tool.

The method discussed above may also include, but is not limited to cold-forming the clutch housing 10 without a plurality of spline teeth 16, heat treating the unfinished shape of the clutch housing 10 using localized induction heating, and forming and sizing the plurality of spline teeth 16 using the quenching die. Alternatively, the method may include pre-forming/cold-forming the clutch housing 10 with a plurality of spline teeth 16, heating the unfinished shape of the clutch housing 10 in an inert environment, and sizing and finalizing the shape of the housing 10 in the quenching die. Similarly, planetary gear carriers and other components may be partially or completely cold formed and then heated using either localized or entire part heating.

In addition to the clutch housing 10 disclosed above, other embodiments of components from ultra-high strength steel constructed in accordance with the present disclosure are described in more detail below. FIG. 8 shows a clutch hub 500 in accordance with a second embodiment of the present disclosure. The clutch hub 500 has a cup-like shape having a radial ring portion 502 and a cylindrical drum portion 504. A tubular neck 506 extends longitudinally from the radial ring portion 502 and a drive gear 508 is attached to the tubular neck 506. Like the clutch housing 10, the clutch hub 500 may be formed from a strip (i.e. blank) of ultra-high strength steel. The ultra-high strength steel may also be pre-coated with aluminum silicon (AlSi) or other material to prevent corrosion and decarburization during the heating and quenching steps. The clutch hub 500 may be a single piece or may be two pieces joined together by a weld or may be pressed-formed. To form the clutch hub 500, a blank of boron steel can be cold-formed into a predetermined or unfinished shape. A plurality of generally triangular openings 510 can be formed in the radial ring portion during cold forming for weight reduction. The predetermined shape may then be heat treated in an inert environment. Next, the clutch hub 500 may be exposed to a water cooled quenching tool die to form a plurality of radially outwardly extending spline teeth 512 disposed about the cylindrical drum portion 504.

FIG. 9 shows a continuously variable transmission (CVT) plunger 520 in accordance with a third embodiment of the present disclosure. The CVT plunger 520 includes a generally bell-shaped body defining a centrally disposed opening 522. The CVT plunger 520 is formed from a preformed flat blank of ultra-high strength steel, preferably 22MnB5 boron steel. The blank of boron steel may be cold-formed into a predetermined or unfinished shape with a thick center and outer edge. The predetermined shape shape can then be heat treated in an inert environment. Next, the CVT plunger 520 can be exposed to a water cooled quenching tool die.

FIG. 10 shows a CVT cylinder 540 in accordance with a fourth embodiment of the present disclosure. The CVT cylinder 540 includes an annular or cylindrically shaped body having a first end 542 and a second end 544 and including a shoulder 546 formed at the first end 542. The body of the CVT cylinder 540 defines an opening 548 longitudinally extending from the first end 542 to the second end 544. The CVT cylinder 540 begins as a preformed flat blank of ultra-high strength steel, preferably 22MnB5 boron steel, with the centrally disposed material removed and discarded. Next, the preformed blank or unfinished shape is heat treated in an inert environment. Then, the CVT cylinder 540 is exposed to a water cooled quenching tool die.

Figure 11:
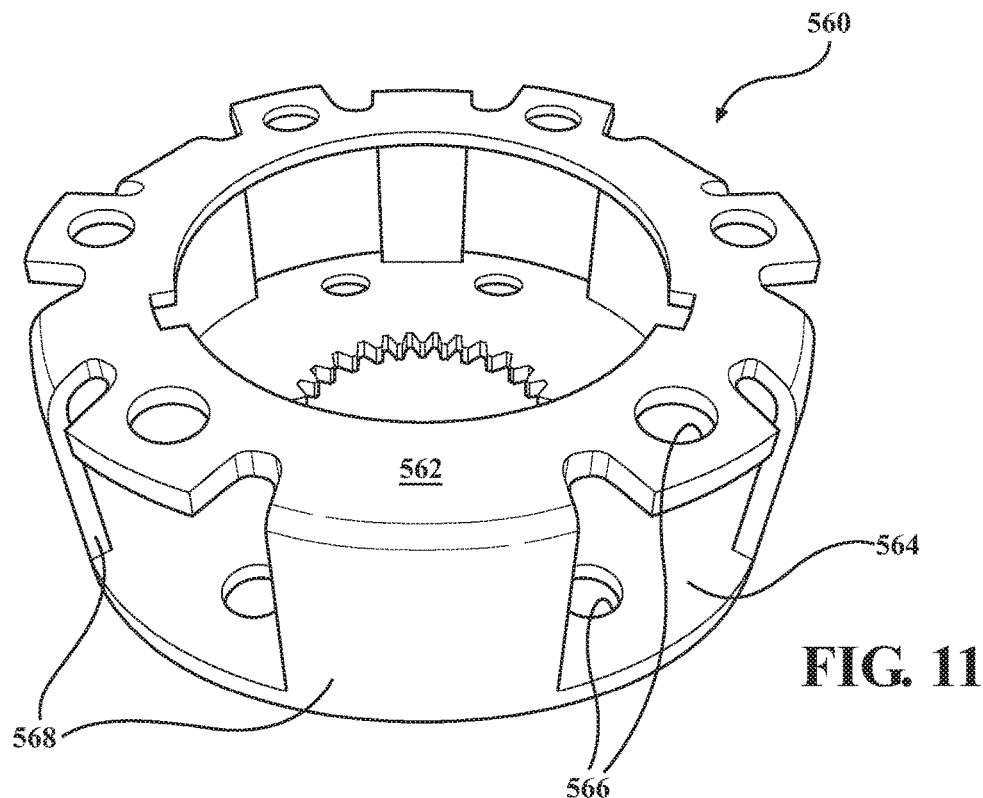
FIG. 11 is a perspective view of a planetary carrier in accordance with another embodiment of the present disclosure.

FIG. 11 shows a planetary carrier 560 in accordance with a fifth embodiment of the present disclosure. The planetary carrier 560 comprises a first piece 562 and a second piece 564 joined together by a weld. A plurality of apertures 566 are circumferentially disposed in a spaced relationship to each other about the perimeter of each piece 562, 564. The first piece 562 includes a plurality of legs 568 extending longitudinally. To form the first piece 562 of the planetary carrier 560, a flat blank of boron steel can be cold-formed into a predetermined or unfinished shape with the plurality of apertures 566 and including the legs 568. To form the second piece 564 of the planetary carrier 560, a flat blank of boron steel can be cold-formed into a an unfinished shape with the plurality of apertures 566. The unfinished shapes of the pieces 562, 564 are heat treated in an inert environment. Next, each piece 562, 564 of the carrier 560 may be exposed to a water cooled quenching tool die. The planetary carrier 560 is completed by joining or welding the legs 568 of the first piece 562 to the second piece 564.

Figure 12A:
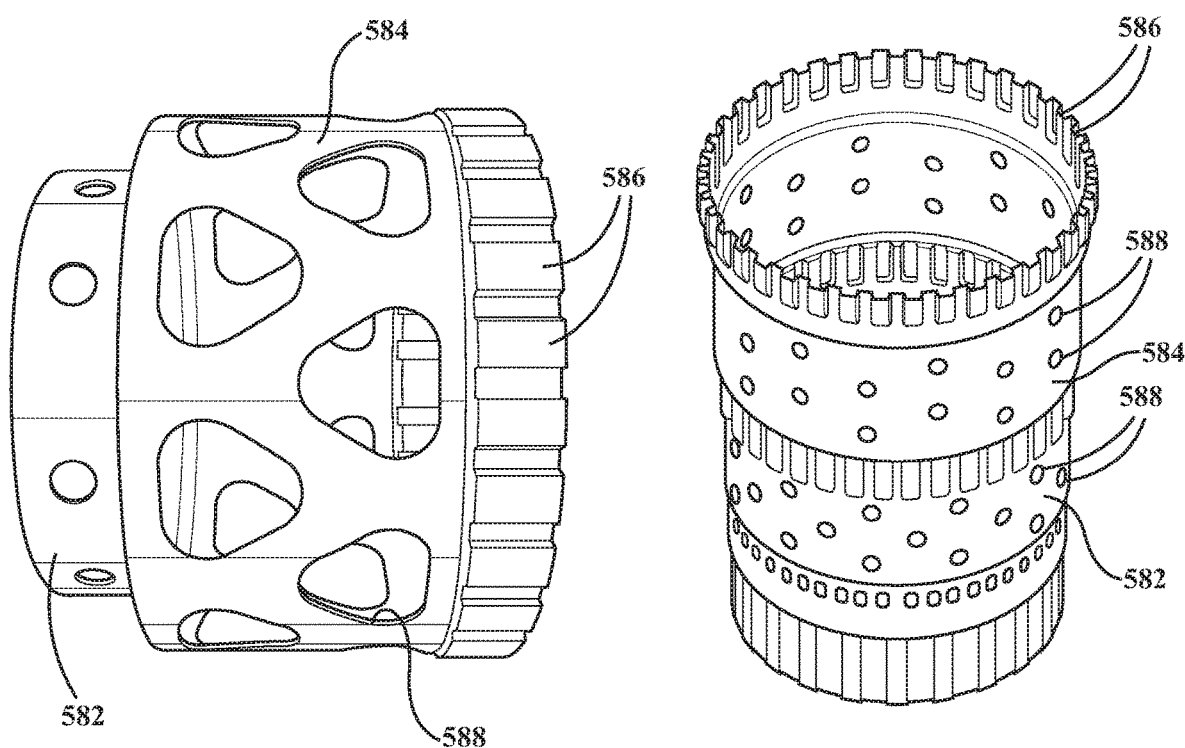
FIG. 12A is a perspective view of a reaction shell in accordance with another embodiment of the present disclosure.
Figure 12B:
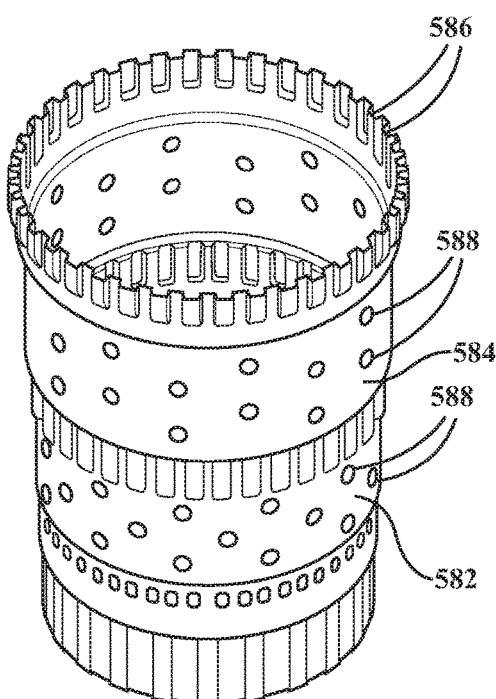
FIG. 12B is a perspective view of a reaction shell in accordance with another embodiment of the present disclosure.

FIGS. 12A and 12B show two reaction shells 580 in accordance with a sixth embodiment of the present disclosure. Each reaction shell 580 comprises a body including a cylindrical first portion 582 of a first diameter and a cylindrical second portion 584 of a second diameter being larger than the first diameter. A plurality of radially outwardly extending spline teeth 586 is disposed about the cylindrical second portion 584. A plurality of bores 588 are defined by the cylindrical first portion 582 and the cylindrical second portion 584. To form the reaction shell 580, a flat blank of boron steel is cold-formed into a predetermined tubular shape or unfinished shape having the bores. The predetermined tubular shape is then heat treated in an inert environment. Although the bores 588 are formed while cold-forming, it should be understood that the bores 588 may also be formed while the predetermined tubular shape is hot. Next, the reaction shell is exposed to a water cooled quenching tool die to hold the geometry and form the radially outwardly extending spline teeth 586 disposed about cylindrical second portion 584.

Figure 13A:
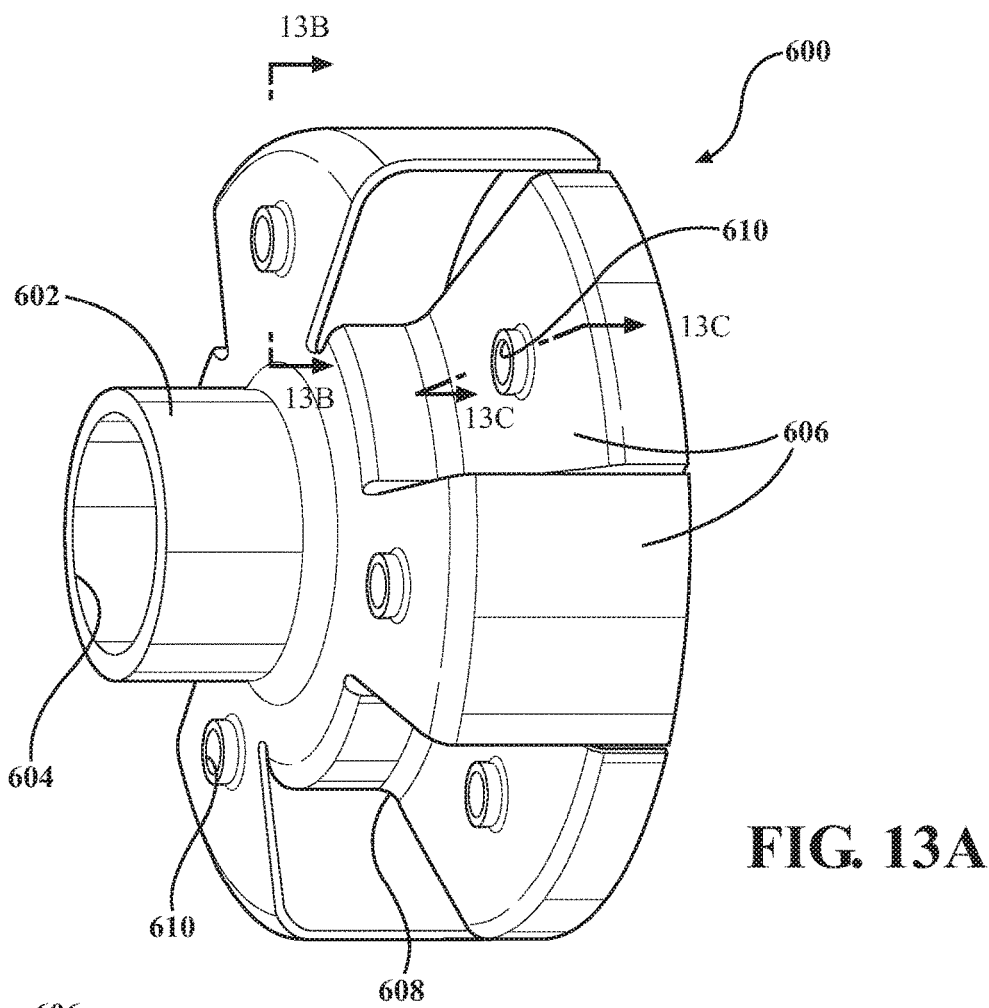
FIG. 13A is a perspective view of a differential housing in accordance with another embodiment of the present disclosure.
Figure 13B:
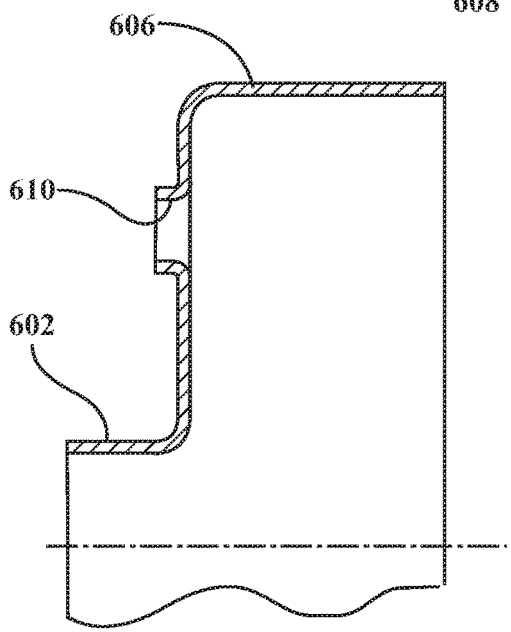
FIG. 13B is a cross-sectional view along 13B-13B of FIG. 13A.
Figure 13C:
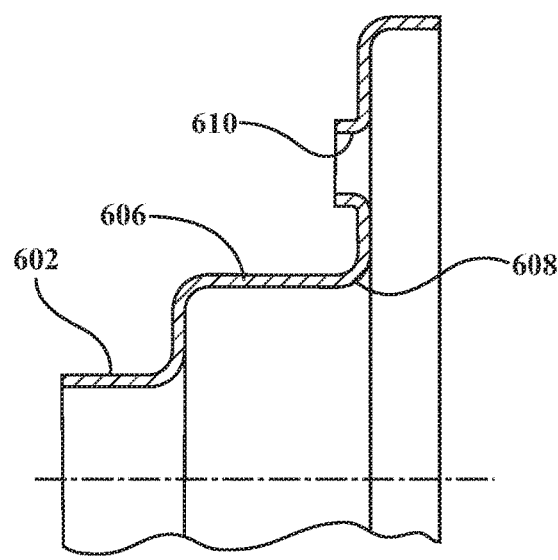
FIG. 13C is a cross-sectional view along 13C-13C of FIG. 13A.

FIG. 13A shows a differential housing 600 in accordance with a seventh embodiment of the present disclosure. The differential housing 600 is generally cup or drum shaped with a tubular neck portion 602 defining a central opening 604 and including a plurality of arms 606 extending radially and longitudinally from the neck portion 602. The arms 606 alternate circumferentially between the arm 606 including a radially inwardly extending shoulder 608 (FIG. 13C) and the arm 606 having a generally L shaped cross section (FIG. 13B). Each arm 606 also includes at least one aperture 610. The differential housing 600 begins as a preformed flat blank of ultra-high strength steel, preferably 22MnB5 boron steel, with an extrusion forming the neck portion 602 and the central opening 604. The preformed blank or unfinished shape is heat treated in an inert environment. Then the differential housing 600 is exposed to a water cooled quenching tool die.

Figure 14:
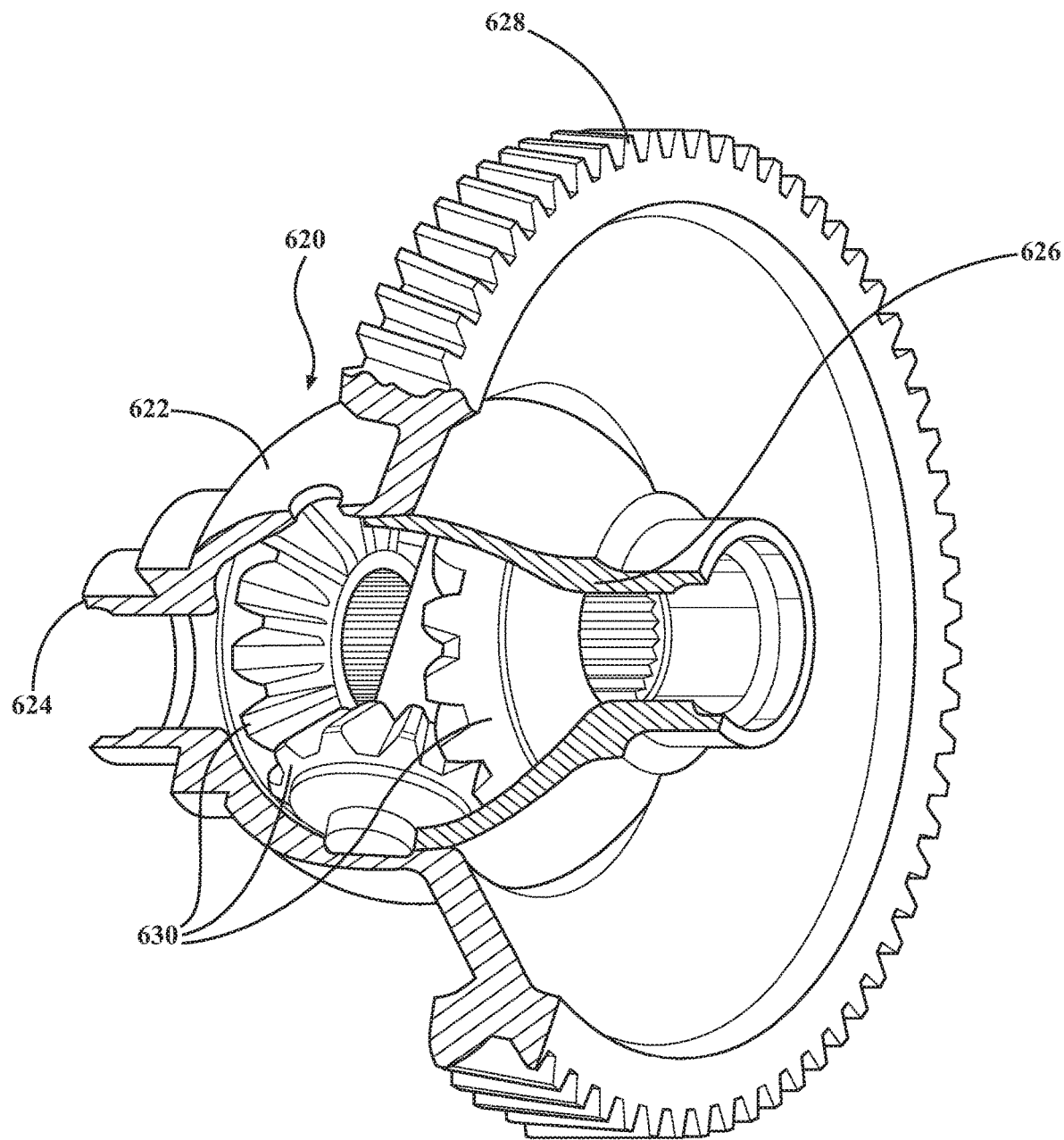
FIG. 14 is a perspective view of a differential cover in accordance with another embodiment of the present disclosure.

FIG. 14 shows a differential cover 620 in accordance with an eighth embodiment of the present disclosure. The differential cover 620 comprises a generally bell shaped body 622 extending between a generally cylindrical first end 624 and an opposite annular second end 626. A ring gear 628 is attached to the second end 626 of the cover 620. The cover 620 is for enclosing a plurality of pinion gears 630. The cover 620 is formed with a flat blank of boron steel that is cold-formed into a unfinished flat or cup shape having an extrusion extending longitudinally at its center. Next, the cover 620 is heat treated in an inert environment. Then the cover 620 is exposed to a water cooled quenching tool die. The ring gear 628 may initially be two pieces which are welded to the outer diameter of the cover 620.

Figure 15A:
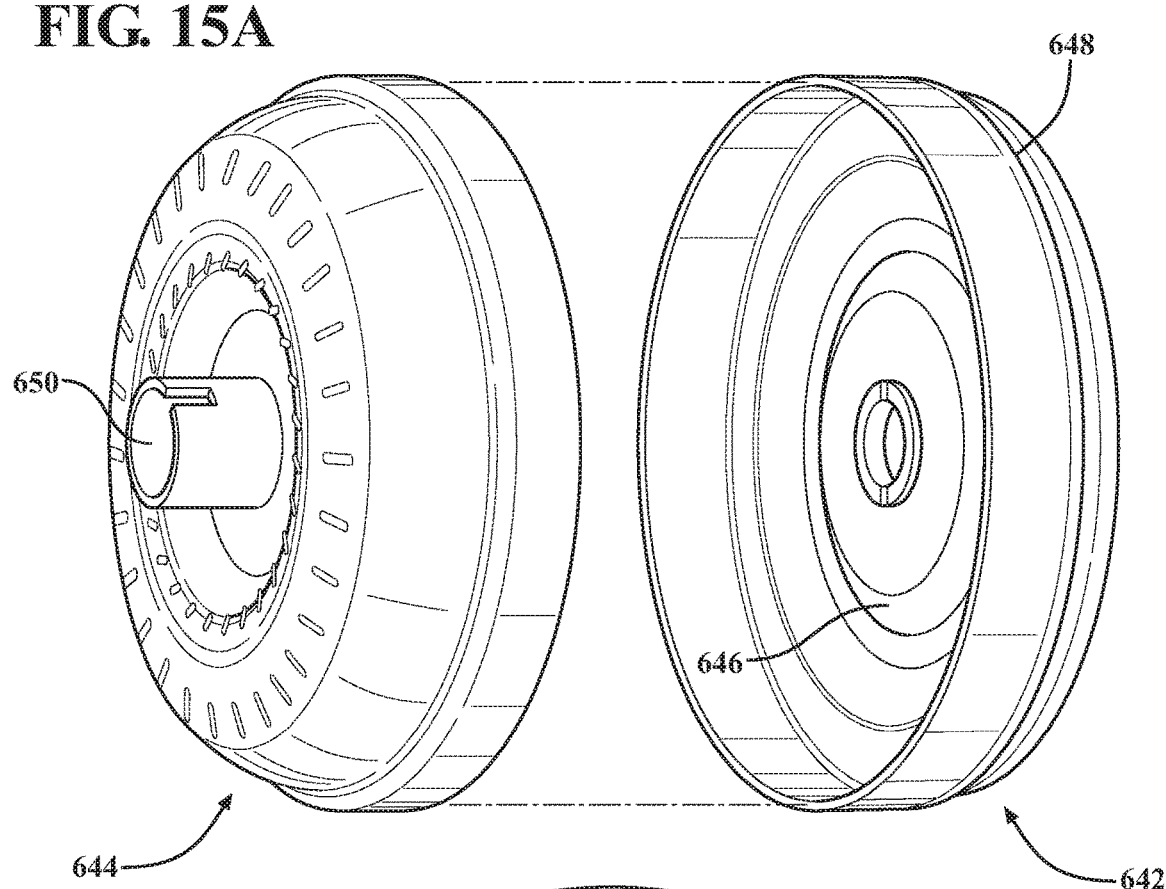
FIG. 15A is a perspective view of a torque converter cover in accordance with another embodiment of the present disclosure.
Figure 15B:
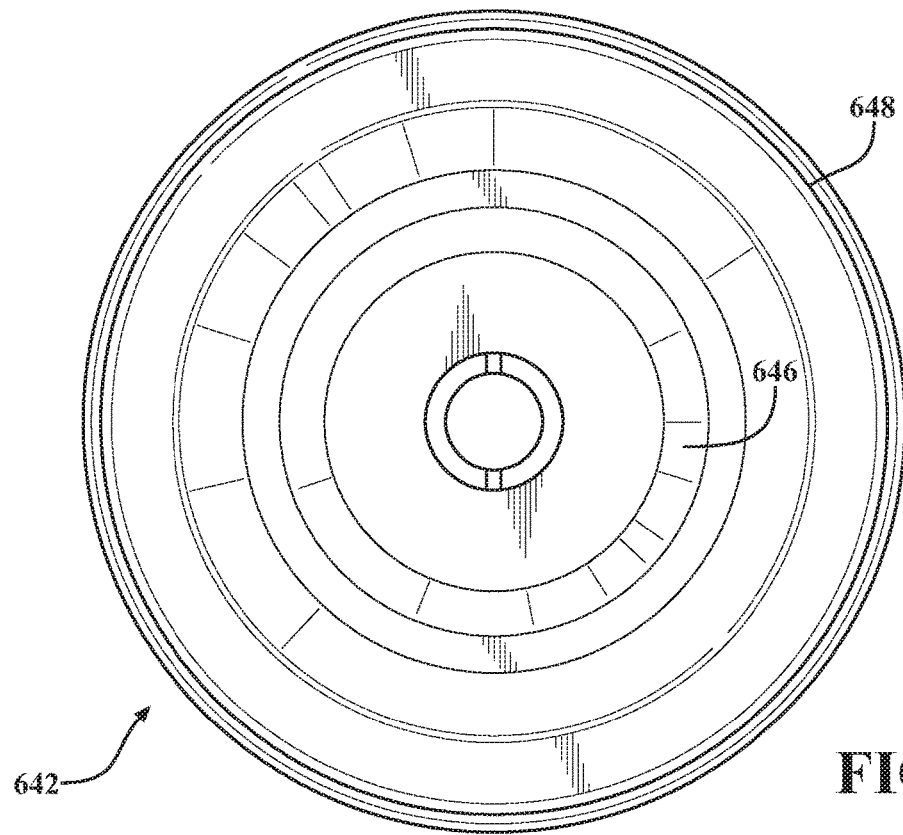
FIG. 15B is a front view of a front portion of the torque converter cover shown in FIG. 15A.
Figure 15C:
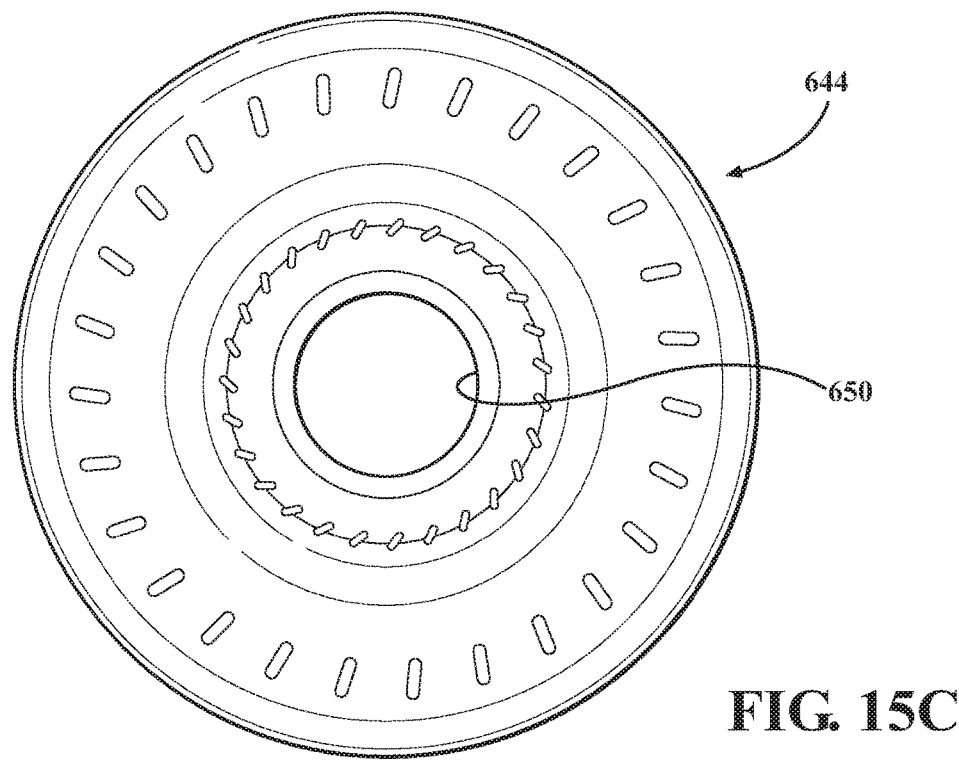
FIG. 15C is a front view of a back portion of the torque converter cover shown in FIG. 15A.

FIG. 15A shows a torque converter cover 640 in accordance with a ninth embodiment of the present disclosure. The torque converter cover 640 comprises a front portion 642 (FIG. 15B) and a back portion 644 (FIG. 15C). The front portion 642 is generally drum-shaped and includes a radial wall 646 having an outer peripheral portion defining a lock-up surface. An integral cylindrical portion 648 of the front portion 642 has an inner surface that extends longitudinally from the radial wall 646. The inner surface of the front portion may also define an internal spline. The back portion 644 is ring shaped and has a center opening 650 and a curved cross-section or half round shape. Each portion 642, 644 begins as a flat blank of boron steel which is cold-formed into a predetermined shape. The predetermined or unfinished shapes may then be heat treated in an inert environment. Next, each portion 642, 644 of the cover can be exposed to a water cooled quenching tool die. Such torque converter covers 640 using higher strength steel allow for a thinner wall which reduces weight compared to covers made from other materials.

Figure 16:
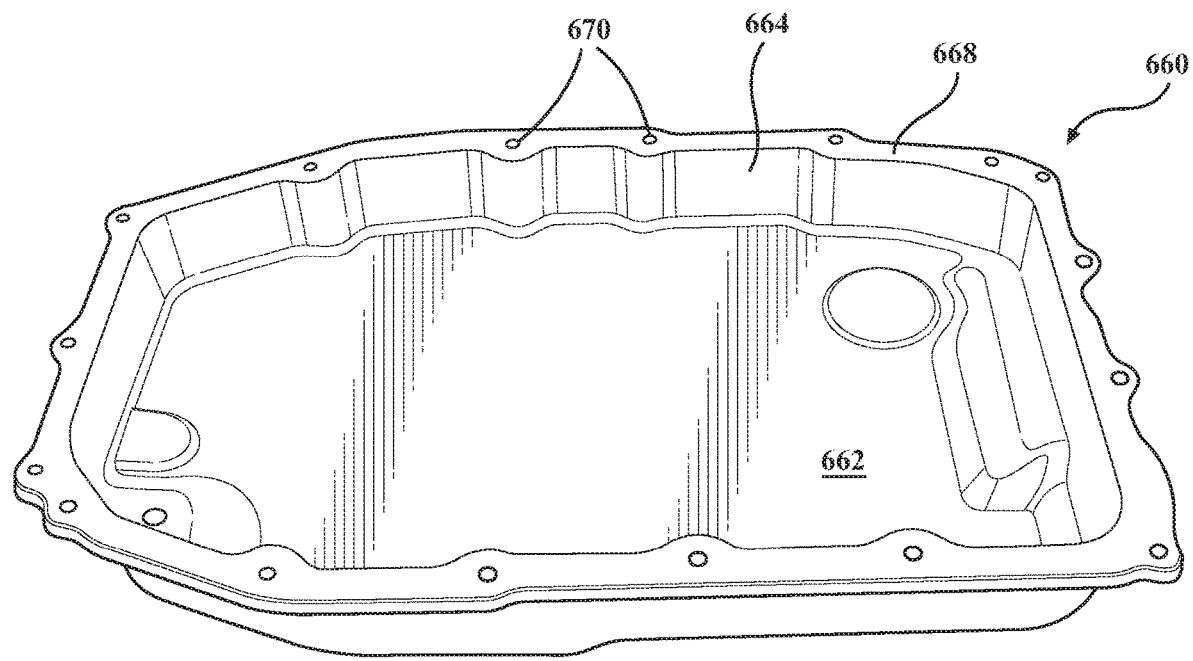
FIG. 16 is a perspective view of an oil pan in accordance with another embodiment of the present disclosure.

FIG. 16 shows an oil pan 660 in accordance with a tenth embodiment of the present disclosure. The oil pan 660 comprises a generally rectangular base 662 with a side wall 664 disposed around the periphery of the base 662 and extending generally perpendicularly from the base 662 to an upper continuous flange 668 adapted to be secured to a block of an engine. A plurality of openings 670 are defined by the flange 668 and spaced from each other circumferentially about the flange 668. The oil pan 660 may be formed from a flat blank of boron steel which is cold-formed into a predetermined shape. The predetermined or unfinished shape may then be heat treated in an inert environment. Then the oil pan 660 can be exposed to a water cooled quenching tool die. The use of high strength steel in this type of application allows for a thinner base 662 and side wall 664 and can also allow for ribbing features.

Figure 18B:
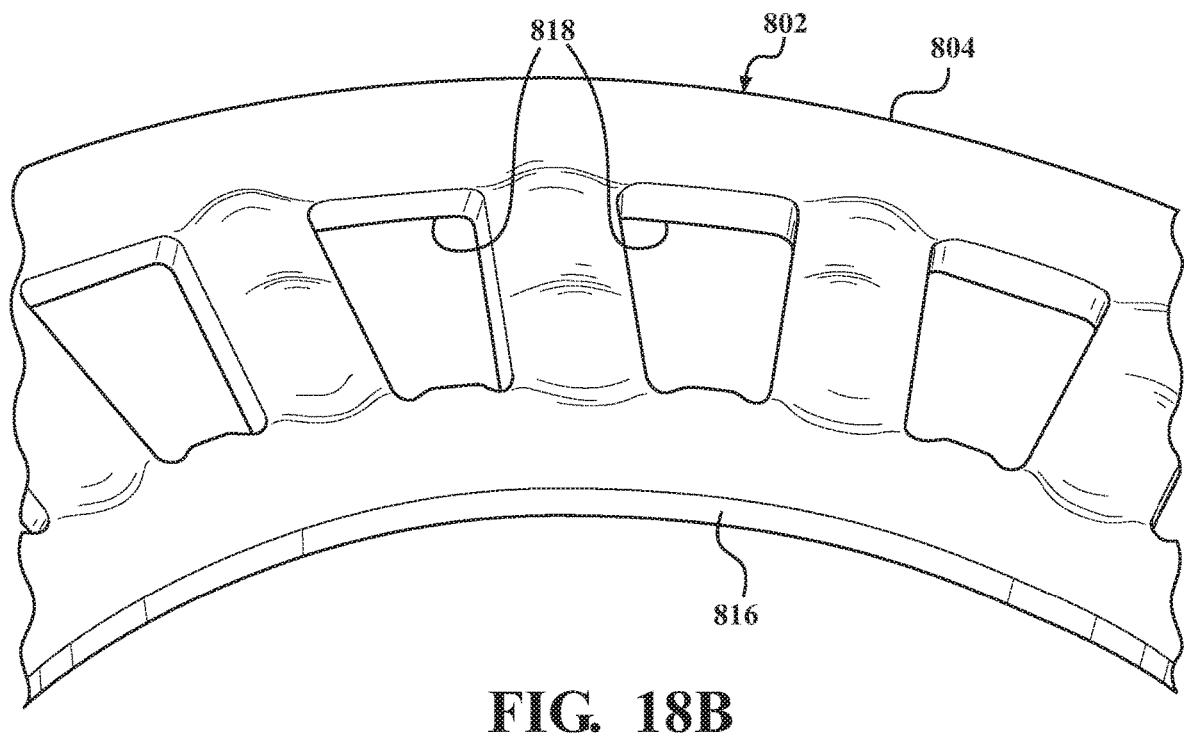
FIG. 18B is an enlarged partial view of the second reaction shell of FIG. 18A.
Figure 19:
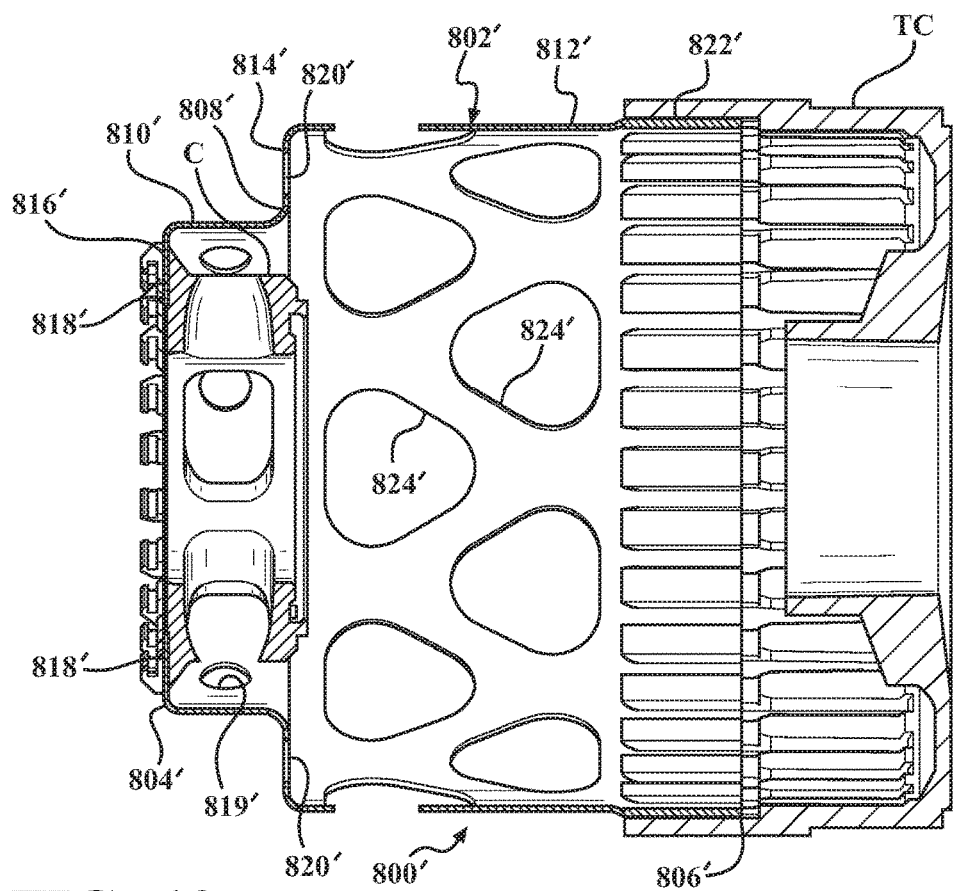
FIG. 19 is cross-sectional view of a reaction shell constructed in accordance with another aspect of the disclosure.
Figure 20:
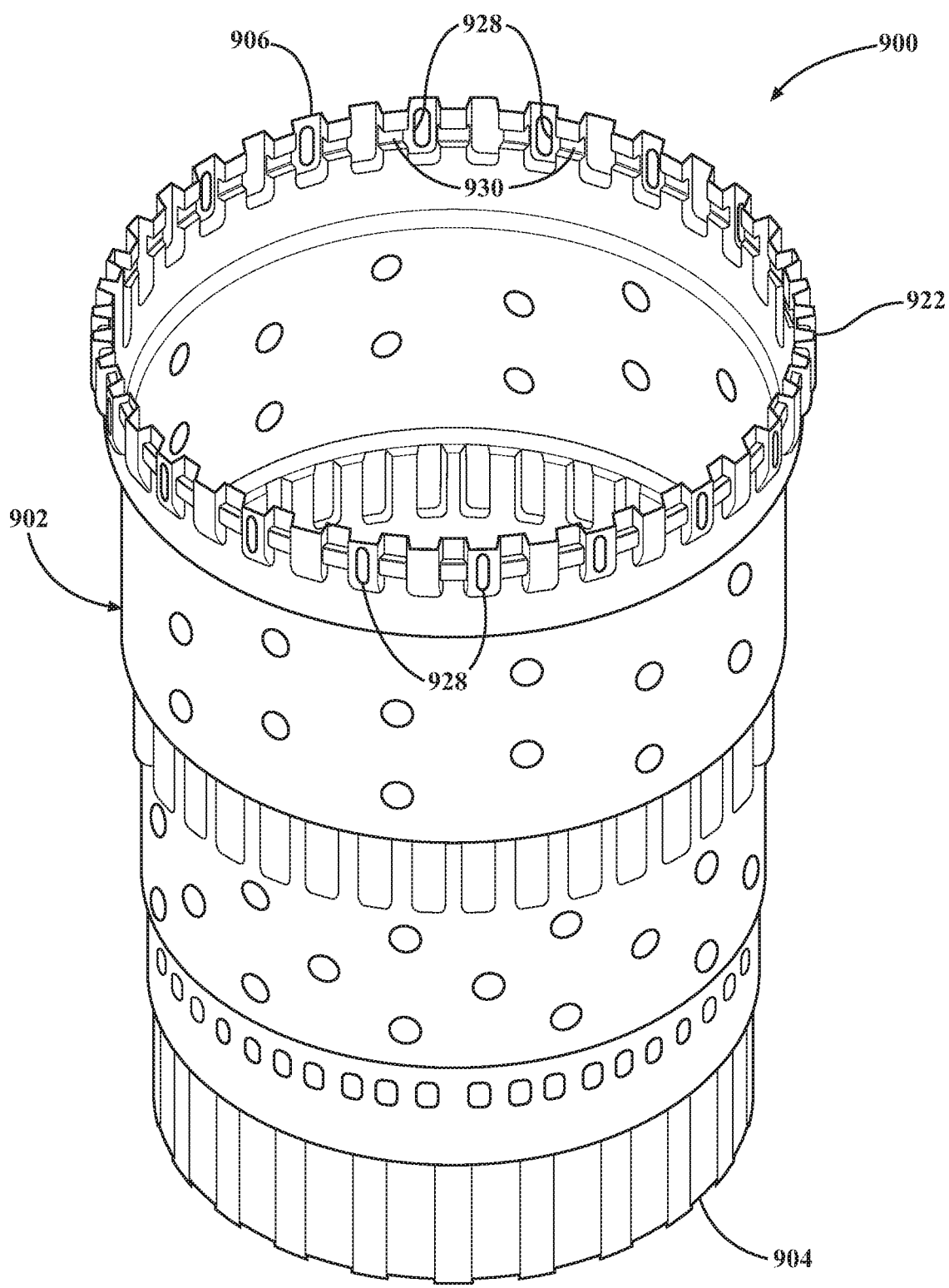
FIG. 20 is a perspective view of a third reaction shell constructed in accordance with yet another aspect of the disclosure.

FIGS. 17, 18A-18B, 19, and 20 show various views of reaction shells 700, 800, 800', 900 constructed in accordance with exemplary embodiments of the present disclosure similar to those shown in FIGS. 12A and 12B. Such reaction shells 700, 800, 800', 900 could, for example, be used as part of a planetary gear assembly in a transmission. In particular, FIG. 17 shows a side view of a first reaction shell 700, FIG. 18A shows a perspective view of a second reaction shell 800, FIG. 18B is an enlarged view of a portion of the second reaction shell 800 and FIG. 19 shows a cross-sectional view of a third reaction shell 800' similar to the reaction shell 800. FIG. 20 is a perspective view of a fourth reaction shell 900. Each reaction shell 700, 800, 800', 900 comprises a body 702, 802, 802', 902 having a proximal end 704, 804, 804', 904 and a distal end 706, 806, 806', 906 and may include a shoulder 708, 808, 808' defined therebetween. Similar to the reaction shells 580 described with reference to FIGS. 12A and 12B above, the body 702, 802, 802', 902 may also include a cylindrical first portion 710, 810, 810' of a first diameter extending from the proximal end 704, 804, 804' to the shoulder 708, 808, 808' and a cylindrical second portion 712, 812, 812' of a second diameter that is larger than the first diameter and extending from the shoulder 708, 808, 808'to the distal end 706, 806, 806'.

Referring now to the reaction shells 700, 800, 800', the shoulder 708, 808, 808' of the body 702, 802, 802' defines a first flange 714, 814, 814' extending radially outwardly from the first portion 710, 810, 810' to the second diameter of the second portion 712, 812, 812'. The first portion 810, 810' of the body 802, 802' may include a radially inwardly extending second flange 816, 816' at the proximal end 804, 804'. The second flange 816, 816' may also define a plurality of slots 818, 818' or castle joint windows spaced circumferentially about the second flange 816, 816' for engaging a carrier (C) (FIG. 19). A plurality of first bores 719, 819, 819' are defined by and disposed circumferentially about the first portion 710, 810, 810' for mass reduction and/or balancing. Similarly, the first flange 814, 814' may also define a plurality of elongate shoulder bores 820, 820' disposed circumferentially.

As best shown in FIGS. 18A and 19, the second portion 812, 812' of the body 802, 802' provides a plurality of radially outwardly extending spline teeth 822, 822' disposed thereabout adjacent the distal end 806, 806'. The spline teeth 822, 822' are intended to engage a transfer component (TC) of a transmission (FIG. 19). A plurality of triangular bores 724, 824 may also defined by and disposed circumferentially about the second portion 712, 812, 812'. Similarly, the second portion 712, 812, 812' of the body 702, 802, 802' may also define speed sensor bores 826 (FIG. 18A) disposed circumferentially for use in conjunction with an optical or Hall Effect speed sensor, for example.

In FIGS. 18A and 18B, areas of the second flange 816 of the body 802 of the second reaction shell 800 between the slots 818 may be "thickened," thereby having a greater thickness compared to immediately adjacent surfaces. As discussed in more detail below, the material forming the reaction shell 800 may be pierced in the center of the slot 818 and moved or molded from the slots 818 or openings to locally thicken the reaction shell 800 to allow engagement to a mating component (e.g. carrier C) with reduced stress.

As best shown FIG. 20 the body 902 of the fourth reaction shell 900 also defines a plurality of radially outwardly extending spline teeth 922 disposed thereabout adjacent the distal end 906. Additionally, the reaction shell 900 defines a plurality of spline bores 928 which are disposed circumferentially about the body 902 and extending radially through a selection of the spline teeth 922. An annular snap ring groove 930 is formed extending into an inner surface of the spline teeth 922.

To form each of the reaction shells 700, 800, 800', 900 or other components, a plurality of "heat assisted calibration" (HAC) method steps may be employed as described above and hereafter. The methods illustrated in FIGS. 21A-28E and described in detail below include more specific method steps for forming specific features (e.g. bores, splines, grooves, tabs, etc.) of a component, such as, but not limited to the reaction shells 700, 800, 800', 900 shown in FIGS. 17, 18A-18B, 19, and 20.

Figure 21A:
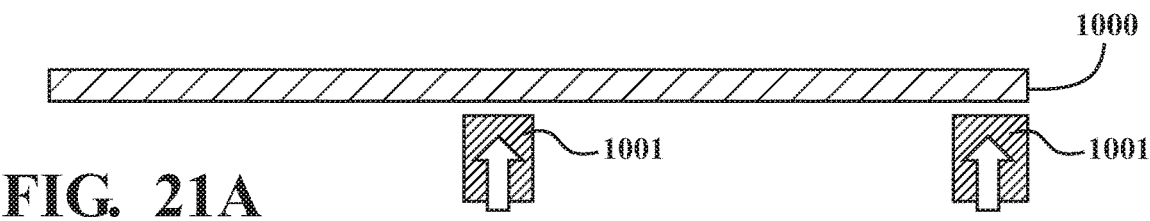
FIGS. 21A-21F show a method of forming a component in accordance with another aspect of the disclosure and illustrated with cross-sectional views taken through a wall of one of the various components constructed in accordance with the disclosure.
Figure 21B:
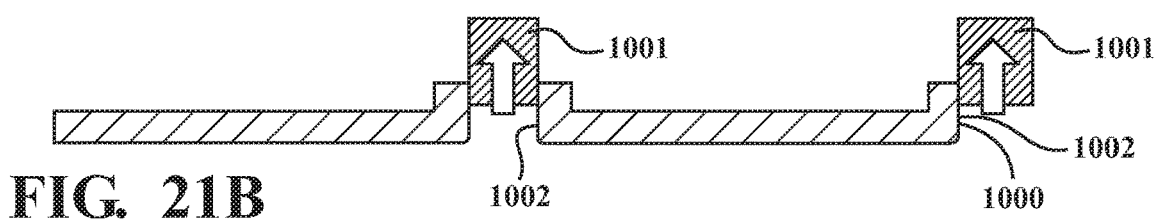
Figure 21C:
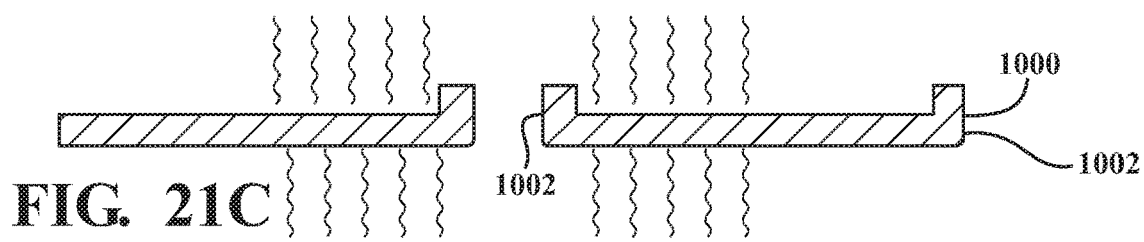
Figure 21D:
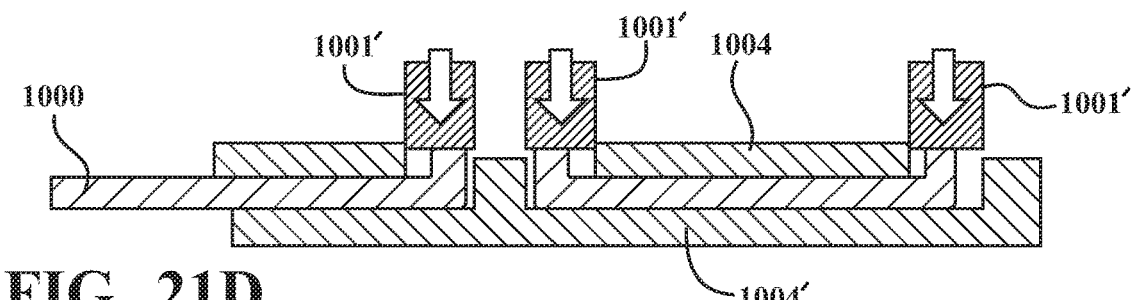
Figure 21E:
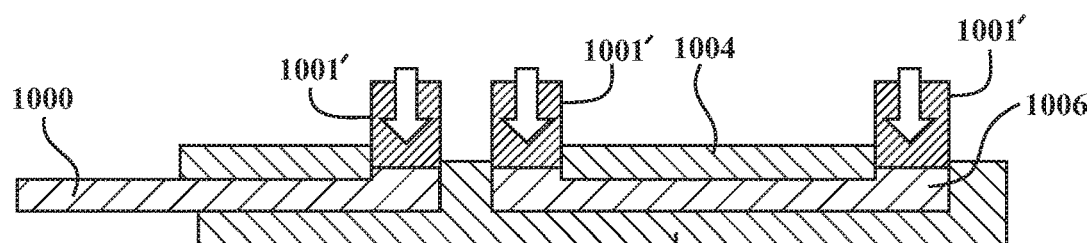
Figure 21F:
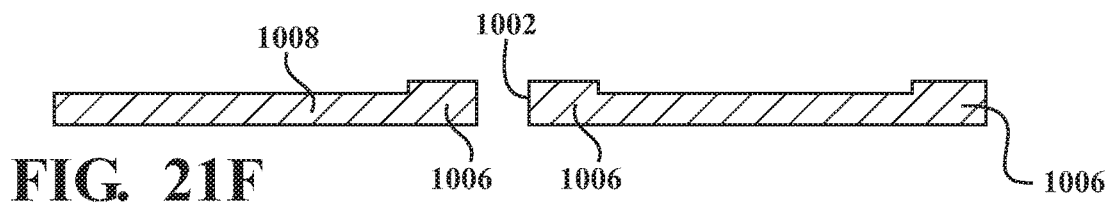

As best shown in FIGS. 21A-21F, a method of forming a component (e.g. reaction shell 700, 800, 800', 900) may include a series of thickening steps. Such a method may be used to form a section of material "up" as in an extrusion of a bore or multiple bores, or around the outer perimeter of a blank while still in its "green" state. FIGS. 21A-21F show, for example, a cross-section of one of the aforementioned components, such as the first reaction shell 700 shown in FIG. 17, by way of example and without limitation. The method begins with cold-forming a blank, such as a flat blank, of boron steel into a predetermined tubular shape, blank, also referred to as unfinished shape component 1000, as best shown in FIG. 21A. Next, punching the unfinished shape component 1000 with at least one punch member, also referred to as punch 1001, to form through holes 1002 (FIG. 21B). The punching occurs while the part or component 1000 is still "green" to produce "formed up", thickened material. As shown in FIG. 21C, the method proceeds with heat treating the predetermined tubular shape component 1000, or at least a portion thereof (e.g. in an inert environment). The next steps of the method include transferring the predetermined, unfinished tubular shape component 1000 to quench and calibration tooling, including an inner and outer tooling member 1004, 1004', and compressing the predetermined tubular shape (i.e. the "formed up" material) between the tooling members 1004, 1004'. The method includes moving at least one or both of the inner and outer tooling members 1004, 1004' from a withdrawn, unactuated position to an extended, actuated position to sandwich the heated, unfinished component 1000 therebetween. It should be recognized that the method can include maintaining one of the tooling members 1004, 1004' in a stationary position, while moving the other of the tooling members 1004, 1004', or moving both of the tooling members 1004, 1004'. Then, with the component 1000 sandwiched between the tooling member 1004, 1004', at least one or more punch members 1001' are actuated into compressing contact with the unfinished component 1000 to form the desired geometry and thickness of a feature while the predetermined tubular shape 1000 remains hot from the heating treating process (FIG. 21D). The desired geometry and thickness, resulting from impacting the formed up material and or other areas of the unfinished component 1000 with the desired configuration of punch member to attain the desired finished configuration. As such, using punch members 1001' may result in thickened areas 1006 having an increased thickness as compared to immediately adjacent material. Specifically, the geometry and thickness are controlled by factors such as, but not limited to the tooling stops and press stroke. Next, the method can include holding the predetermined tubular shape component 1000 between tooling members 1004, 1004' until cooled with the tooling in place, as shown in FIG. 21E. The final part 1008, removed from between tooling members 1004, 1004', is best shown in FIG. 21F and illustrates thickened areas 1006, by way of example and without limitation.

Figure 22A:
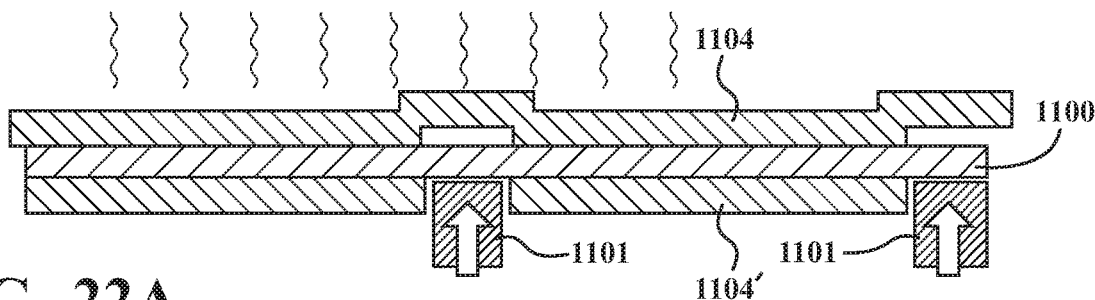
FIGS. 22A-22E show another method of forming a component in accordance with another aspect of the disclosure and illustrated with cross-sectional views taken through a wall of one of the various components constructed in accordance with the disclosure.
Figure 22B:
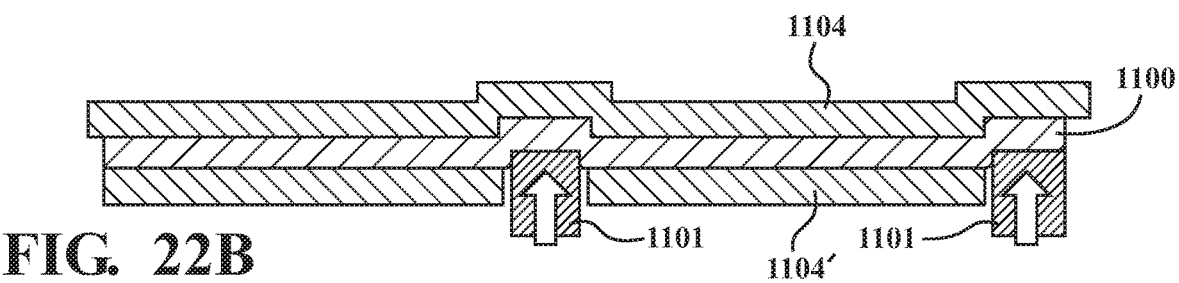
Figure 22C:
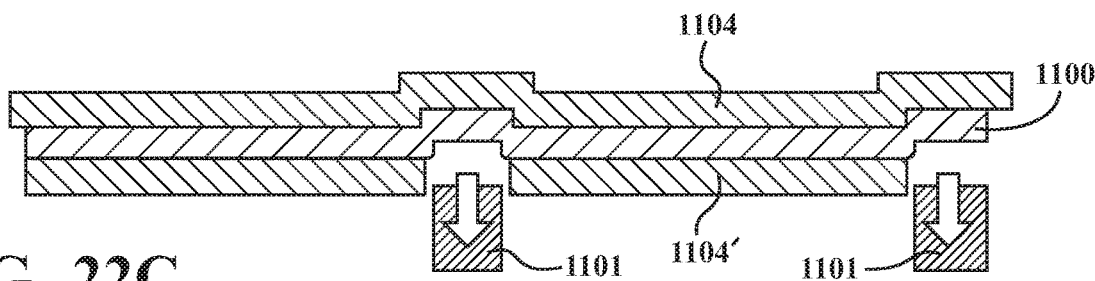
Figure 22D:
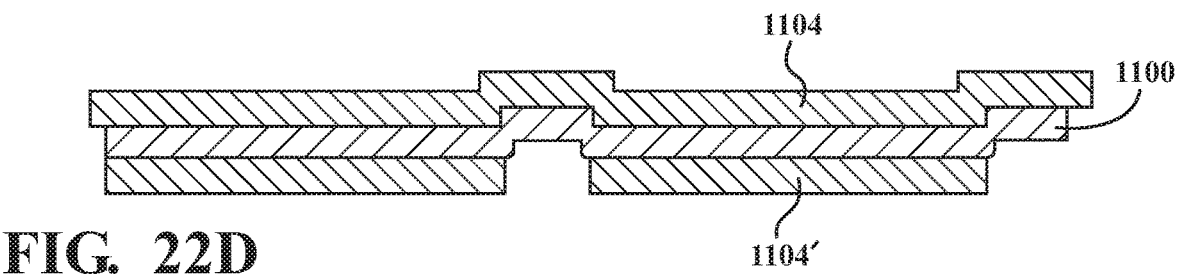
Figure 22E:
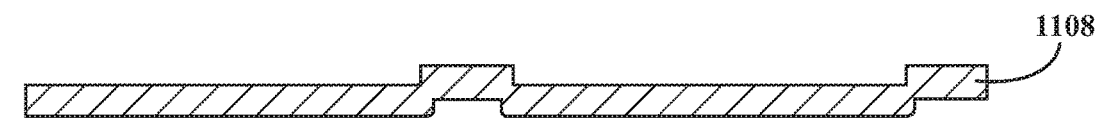

As best shown in FIGS. 22A-22E, a method of forming a component (e.g. reaction shell 700, 800, 800', 900) may include a series of hot forming steps in which a punch member 1101 is removed prior to forming a through opening. Such a method may be used, for example, when it is desired to form the ultra-high strength steel to the chosen geometry without shearing (e.g. forming a snap-ring groove or bent tab). FIGS. 22A-22E show, for example, a cross-section of the first reaction shell 700 shown in FIG. 17. The method begins with heating a component blank or unfinished shape component 1100 (e.g. predetermined tubular shape) in a forming tool, including inner and outer tooling members 1104, 1104' (FIG. 22A), wherein the inner and outer tooling members 1104, 1104' are moveable relative to one another, as discussed above, such that they both may be moveable or either one may remain stationary, with the other being moveable. According to an aspect of the disclosure, the blank 1100 is heated to approximately 900 degrees Celsius. Next, punching the unfinished shape component 1100 by pressing partially into the component 1100 with the punch member 1101 without forming a through opening (FIG. 22B). The punching occurs while the unfinished shape 1100 remains hot from the heat treatment process. As shown in FIG. 22C, the method proceeds with removing the punches 1101 and retaining the tooling 1104, 1104' in contact with the component 1100. The punches 1101 may be removed or retracted before the material 1100 is quenched and the martensitic structure is formed. The next steps of the method are quenching the unfinished shape component 1100 with the punches 1101 removed and while the unfinished part is in contact with the tooling 1104, 1104' until it cools (FIG. 22D). The final part 1108 is best shown in FIG. 22E.

Figure 23A:
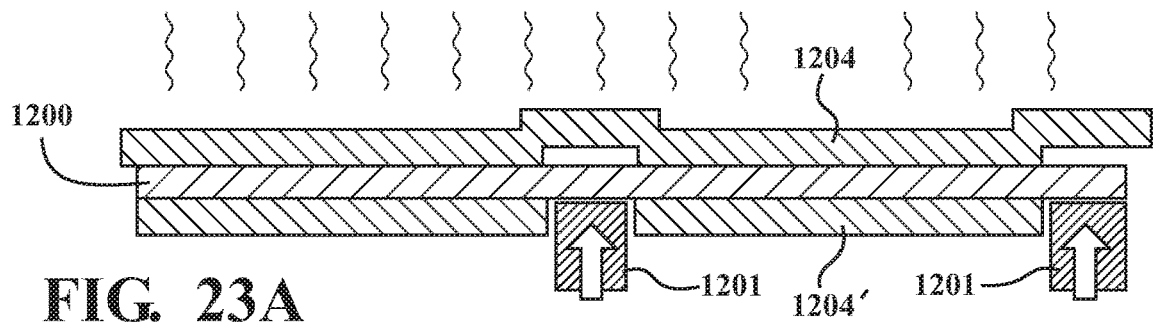
FIGS. 23A-23E show another method of forming a component in accordance with another aspect of the disclosure and illustrated with cross-sectional views taken through a wall of one of the various components constructed in accordance with the disclosure.
Figure 23B:
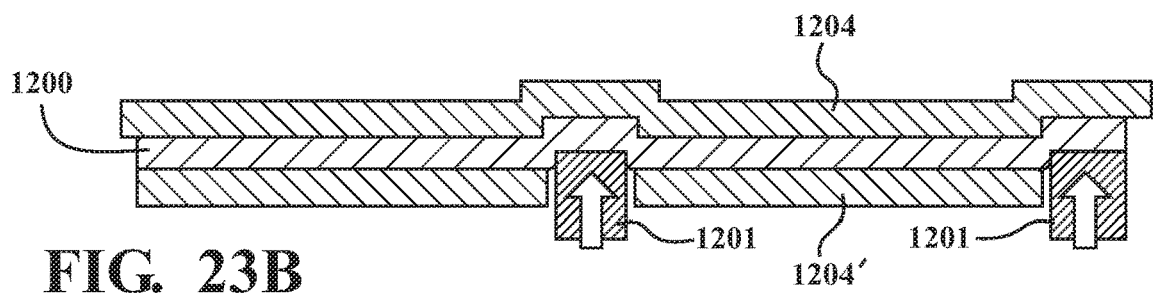
Figure 23C:
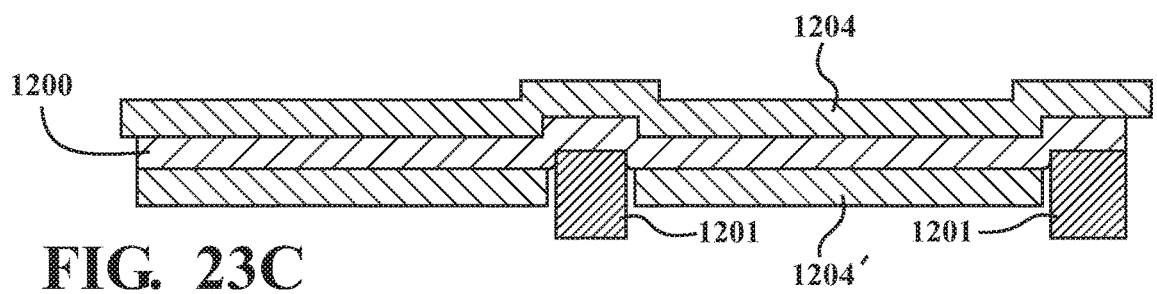
Figure 23D:
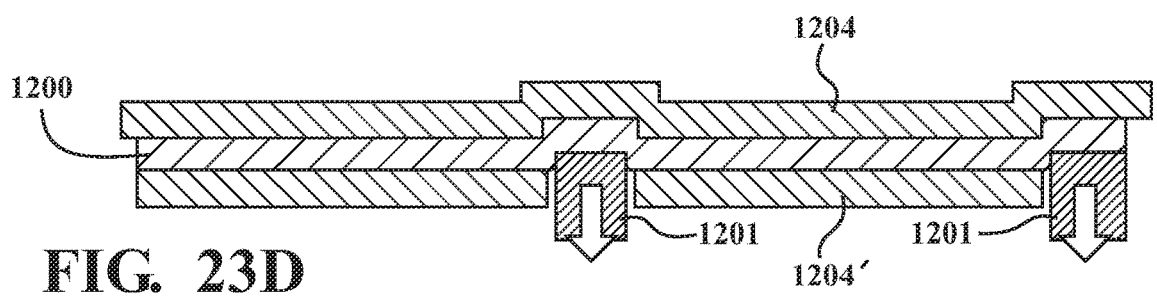
Figure 23E:

As best shown in FIGS. 23A-23E, a method of forming a component (e.g. reaction shell 700, 800, 800', 900) may include a series of hot forming steps in which a punch 1201 is held in place. Such a method may be used when it is desired to form the ultra-high strength steel to the chosen geometry without shearing (e.g. forming a snap-ring groove). FIGS. 23A-23E show, for example, a cross-section of the first reaction shell 700 shown in FIG. 17. The method begins with heating a component blank 1200 or unfinished shape component (e.g. predetermined tubular shape) in a forming tool, including inner and outer tooling members 1204, 1204' (FIG. 23A), wherein the inner and outer tooling members 1204, 1204' are moveable relative to one another, as discussed above, such that they both may be moveable or either one may remain stationary, with the other being moveable. According to an aspect of the disclosure, the component blank 1200 is heated to approximately 900 degrees Celsius. Next, punching the unfinished shape component 1200 by pressing partially through (without forming an opening) with the punch 1201 (FIG. 23B). The punching occurs while the unfinished shape component 1200 is hot. As shown in FIG. 23C, the method proceeds with holding the punches 1201 in place. The method continues by quenching the unfinished shape component 1200 and retaining the tooling 1204, 1204' in contact with the blank 1200 while the punches 1201 are in contact with the unfinished component 1200. By holding the punch members 1201 in place, they may assist with the quenching as long as the geometry allows and no binding will occur. The method concludes with removing the punches 1201 after cooling (FIG. 23D). The final part 1208 is best shown in FIG. 23E.

Figure 24A:
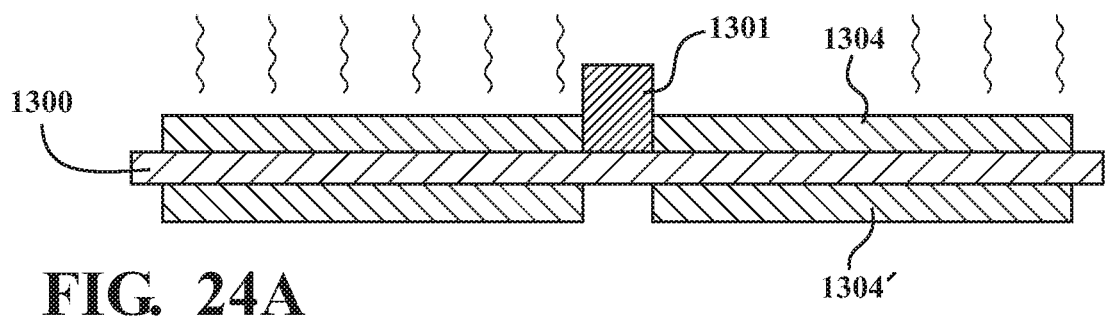
FIGS. 24A-24E show another method of forming a component in accordance with another aspect of the disclosure and illustrated with cross-sectional views taken through a wall of one of the various components constructed in accordance with the disclosure.
Figure 24B:
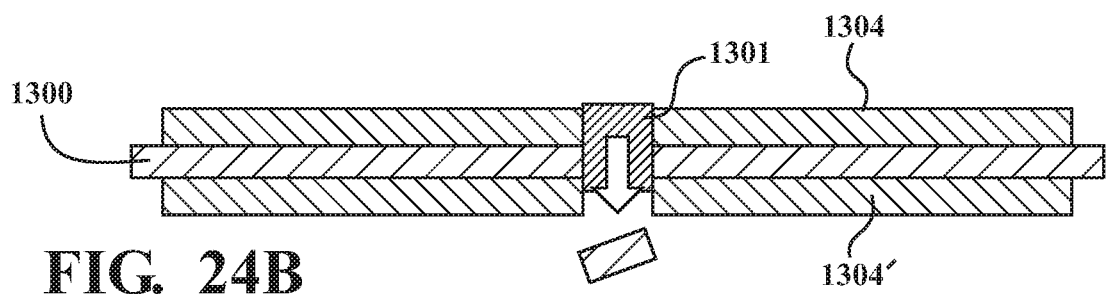
Figure 24C:
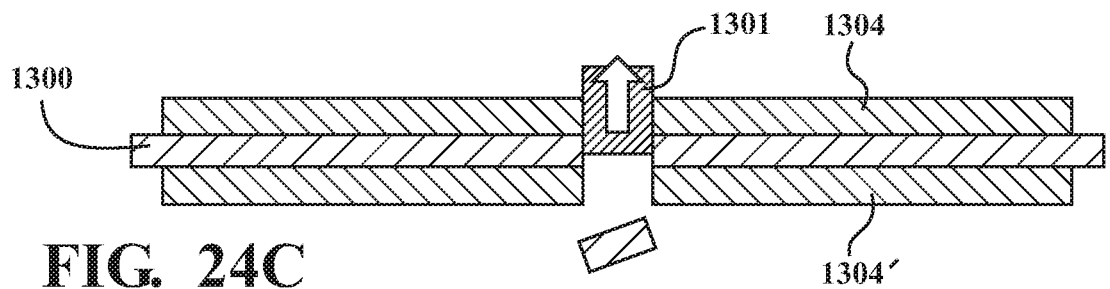
Figure 24D:
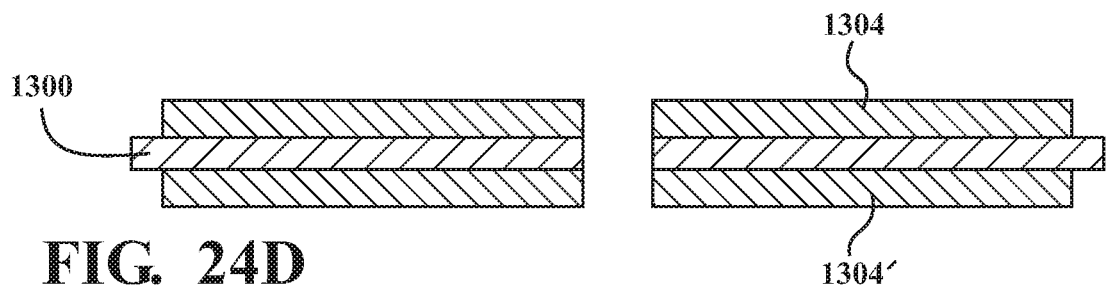
Figure 24E:
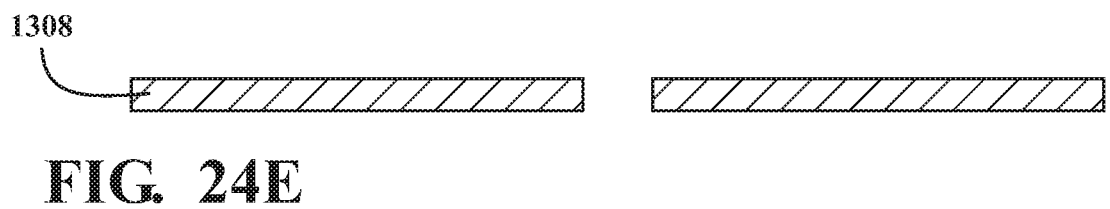

As best shown in FIGS. 24A-24E, a method of forming a component (e.g. reaction shell 700, 800, 800', 900) may include a series of hot piercing steps. Such a method may be used when it is desired to shear the ultra-high strength steel and then retract punches 1301 before the component material 1300 is quenched and the martensitic structure is formed. FIGS. 24A-24E show, for example, a cross-section of the fourth reaction shell 900 shown in FIG. 20. The method begins with heating a component blank 1300 or unfinished shape component (e.g. predetermined tubular shape) in a forming tool, including inner and outer tooling members 1304, 1304' (FIG. 24A), wherein the inner and outer tooling members 1304, 1304' are moveable relative to one another, as discussed above, such that they both may be moveable or either one may remain stationary, with the other being moveable. According to an aspect of the disclosure, the component blank 1300 is heated to approximately 900 degrees Celsius. Next, extending punch members 1301 to shear the blank 1300 or unfinished shape, thereby forming an opening (FIG. 8B). The punching occurs while the unfinished shape component 1300 is hot. As shown in FIG. 24C, the method proceeds with removing the punch members 1301. The method continues by quenching the unfinished shape with the punch members 1301 removed and retaining the tooling 1304, 1304' in contact with the component 1300 as best shown in FIG. 24D. The final part 1308 is best shown in FIG. 24E.

Figure 25A:
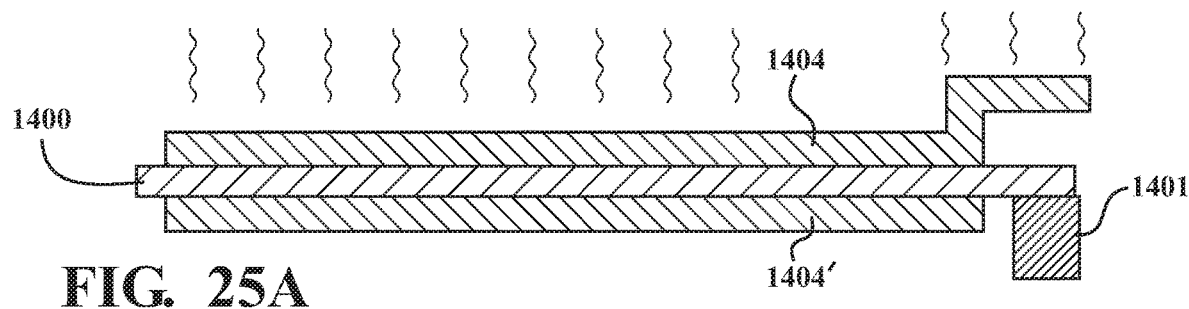
FIGS. 25A-25E show another method of forming a component in accordance with another aspect of the disclosure and illustrated with cross-sectional views taken through a wall of one of the various components constructed in accordance with the disclosure.
Figure 25B:
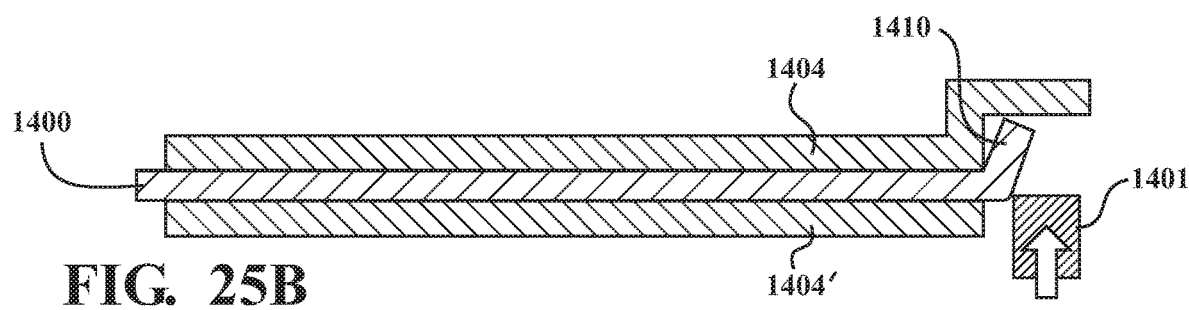
Figure 25C:
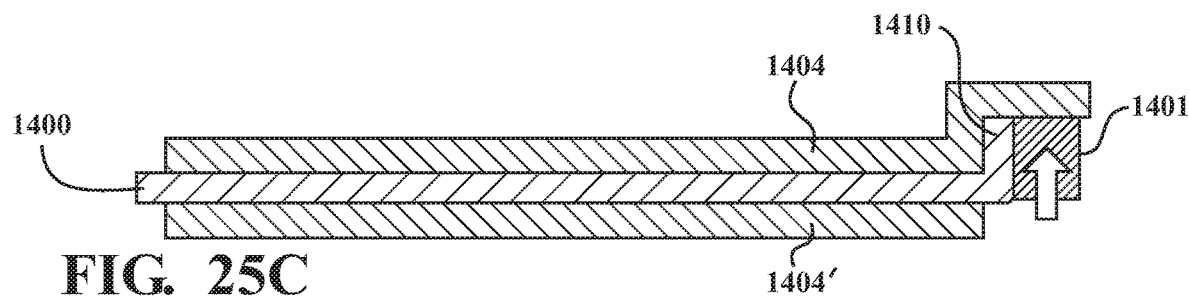
Figure 25D:
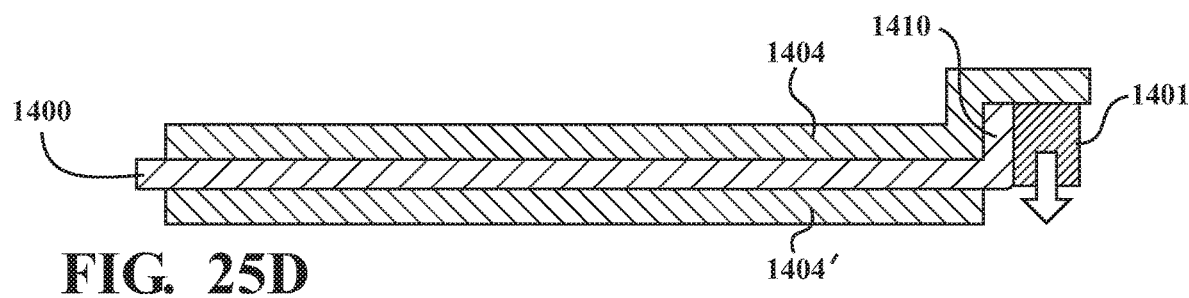
Figure 25E:
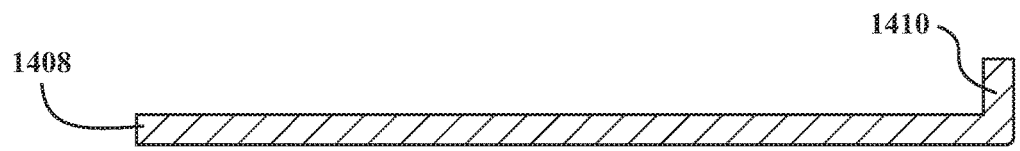

As best shown in FIGS. 25A-25E, a method of forming a component (e.g. reaction shell 700, 800, 800', 900) may include a series of hot forming steps in which a punch 1401 is held in place to form a feature such as a tab face 1410. Such a method may be used when it is desired to bend the ultra-high strength steel to the chosen geometry (e.g. forming the tab face 1410). FIGS. 25A-25E show, for example, a cross-section of the first reaction shell shown in FIG. 17. The method begins with heating a blank 1400 or unfinished shape component (e.g. predetermined tubular shape) in a forming tool, including inner and outer tooling members 1404, 1404' (FIG. 25A), wherein the inner and outer tooling members 1404, 1404' are moveable relative to one another, as discussed above, such that they both may be moveable or either one may remain stationary, with the other being moveable. According to an aspect of the disclosure, the component blank 1400 is heated to approximately 900 degrees Celsius. Next, forming tab face 1410 into unfinished shape by turning an edge into face 1410 by pressing a punch 1401 through (FIG. 25B). The forming occurs while the unfinished shape component 1400 is hot. As shown in FIG. 25C, the method proceeds with completing the forming of the tab face 1410 by completely following through of the punch member 1401 into engagement with the tooling member 1404 and holding the punch member 1401 in place. The method continues by quenching the unfinished shape 1400 and retaining the tooling 1404, 1404' in contact with the blank 1400 while the punches 1401 are in contact with the unfinished part 1400 (FIG. 25D). By holding the punches 1401 in place, they may assist with the quenching as long as the geometry allows and no binding will occur. The method concludes with removing the punch members 1401 after cooling. The final part 1408 is best shown in FIG. 25E.

Figure 26A:
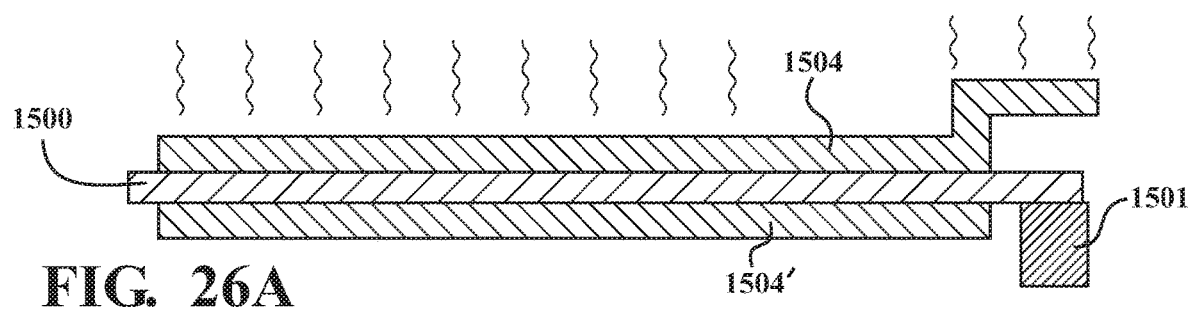
FIGS. 26A-26E show another method of forming a component in accordance with another aspect of the disclosure and illustrated with cross-sectional views taken through a wall of one of the various components constructed in accordance with the disclosure.
Figure 26B:
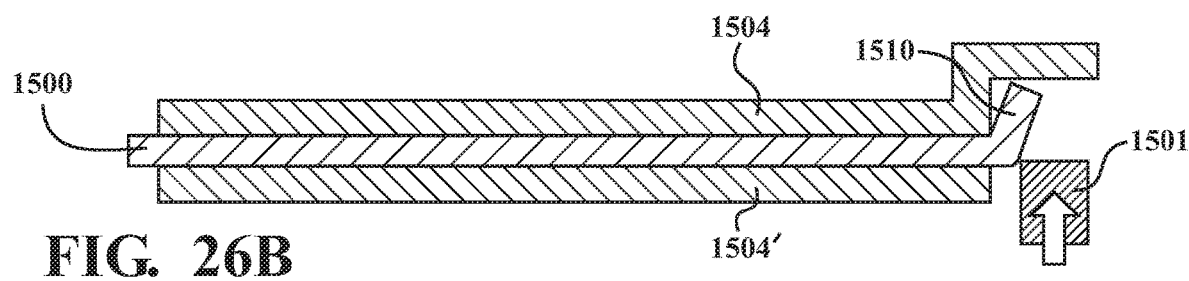
Figure 26C:
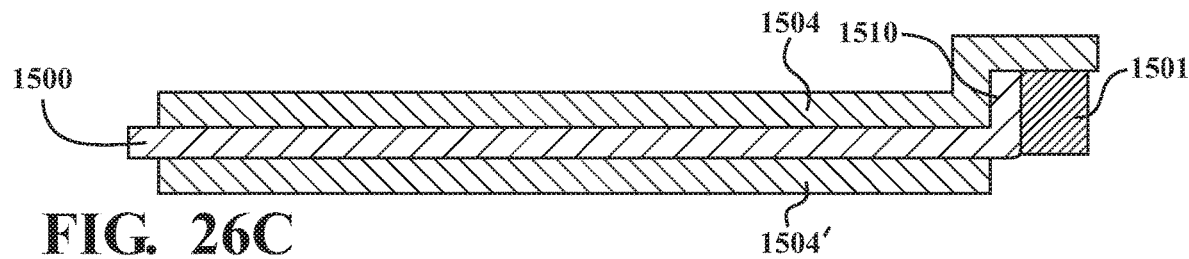
Figure 26D:
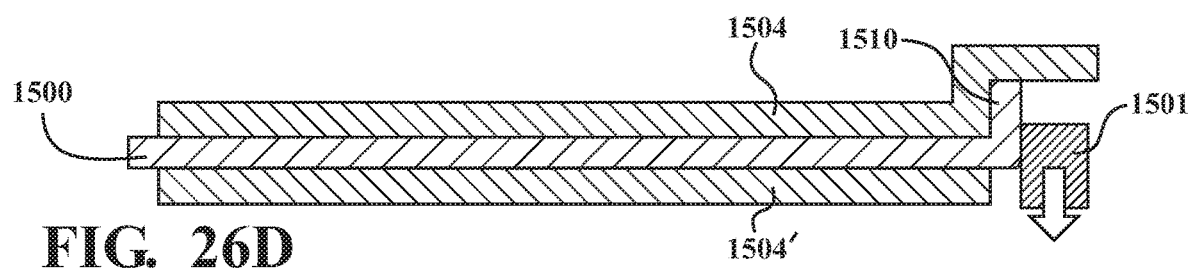
Figure 26E:

As best shown in FIGS. 26A-26E, a method of forming a component (e.g. reaction shell 700, 800, 800', 900) may include a series of hot forming steps in which a punch 1501 is removed to form a feature such as a tab face 1510. Such a method may be used when it is desired to bend the ultra-high strength steel to the chosen geometry (e.g. forming the tab face 1510). FIGS. 26A-26E show, for example, a cross-section of the first reaction shell 700 shown in FIG. 17. The method begins with heating a blank or unfinished shape 1500 (e.g. predetermined tubular shape) in a forming tool, including inner and outer tooling members 1504, 1504' (FIG. 26A), wherein the inner and outer tooling members 1504, 1504' are moveable relative to one another, as discussed above, such that they both may be moveable or either one may remain stationary, with the other being moveable. According to an aspect of the disclosure, the blank 1500 is heated to approximately 900 degrees Celsius. Next, forming a tab face 1510 into unfinished shape component 1500 by turning an edge into face 1510 by pressing and extending a punch member 1501 beyond a tubular wall portion (FIG. 26B). The forming occurs while the unfinished shape component 1500 is hot. As shown in FIG. 26C, the method proceeds with completing the forming of the tab face 1510 by completely following through with the punch member 1501 into engagement with the tooling member 1504. The next steps of the method include removing the punch member 1501 and quenching the unfinished shape 1500 and retaining the tooling 1504, 1504' in contact with the blank 1500 (FIG. 26D). The final part 1508 is best shown in FIG. 26E.

Figure 27A:
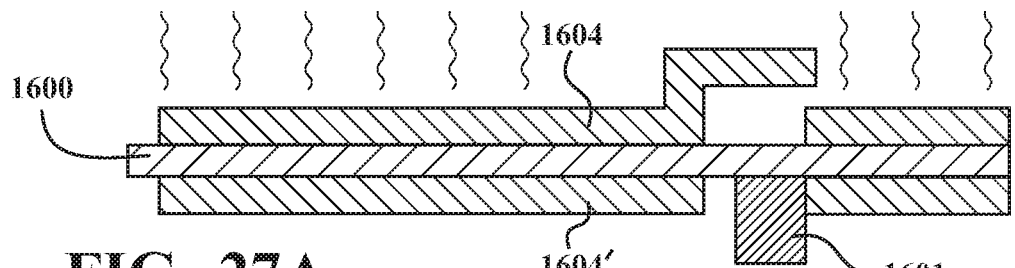
FIGS. 27A-27E show another method of forming a component in accordance with another aspect of the disclosure and illustrated with cross-sectional views taken through a wall of one of the various components constructed in accordance with the disclosure.
Figure 27B:
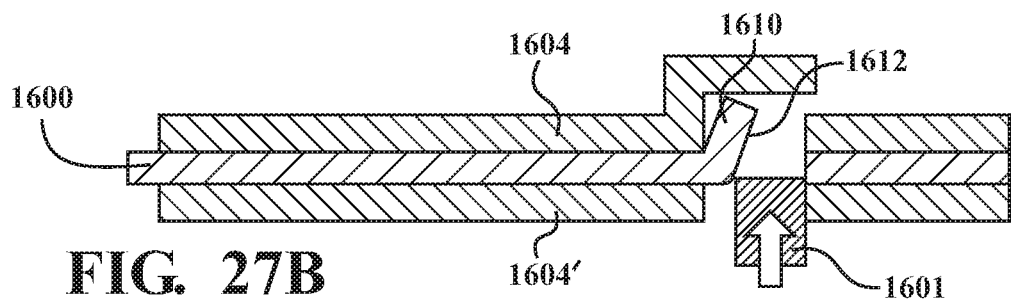
Figure 27C:
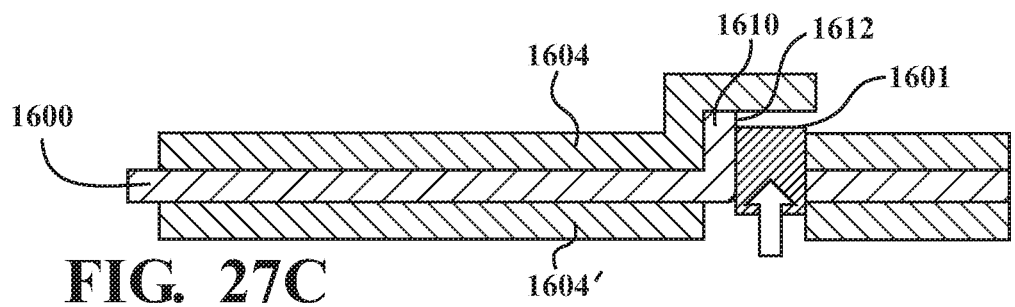
Figure 27D:
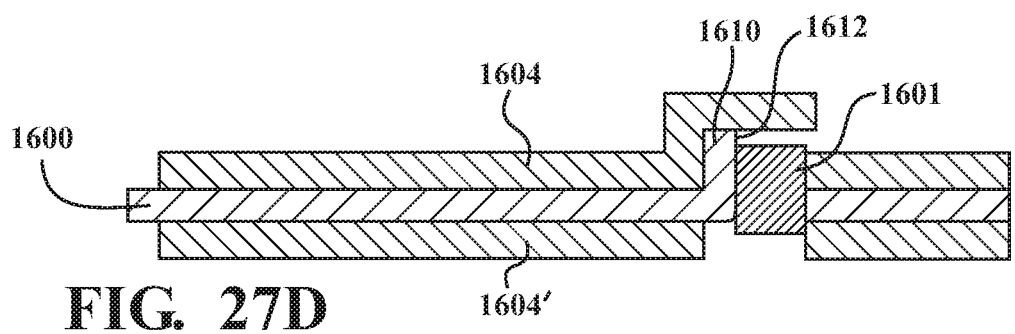
Figure 27E:
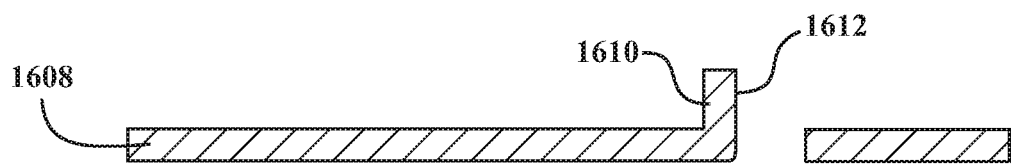

As best shown in FIGS. 27A-27E, a method of forming a component (e.g. reaction shell 700, 800, 800', 900) may include a series of hot forming steps in which a punch 1601 is held in place to form a feature such as a tab hole 1612. Such a method may be used when it is desired to bend the ultra-high strength steel to the chosen geometry (e.g. forming the tab hole 1612). FIGS. 27A-27E show, for example, a cross-section of the first reaction shell 700 shown in FIG. 17. The method begins with heating a blank 1600 or unfinished shape component (e.g. predetermined tubular shape) in a forming tool, including inner and outer tooling members 1604, 1604' (FIG. 27A), wherein the inner and outer tooling members 1604, 1604' are moveable relative to one another, as discussed above, such that they both may be moveable or either one may remain stationary, with the other being moveable. According to an aspect of the disclosure, the blank 1600 is heated to approximately 900 degrees Celsius. Next, forming a tab hole 1612 into unfinished shape by turning an edge into a tab face 1610 by pressing a punch member 1601 through and shearing one side of the unfinished part 1600 (FIG. 27B). The forming occurs while the unfinished shape 1600 is hot. As shown in FIG. 27C, the method proceeds with completing the forming of the tab hole 1612 by completely following through of the punch member 1601 and holding the punch member 1601 in place. The method continues by quenching the unfinished shape component 1600 and retaining the tooling 1604, 1604' in contact with the blank 1600 while the punches 1601 are in contact with the unfinished part 1600 (FIG. 27D). By holding the punches 1601 in place, they may assist with the quenching as long as the geometry allows and no binding will occur. The method concludes with removing the punches 1601 after cooling. The final part 1608 is best shown in FIG. 27E.

Figure 28A:
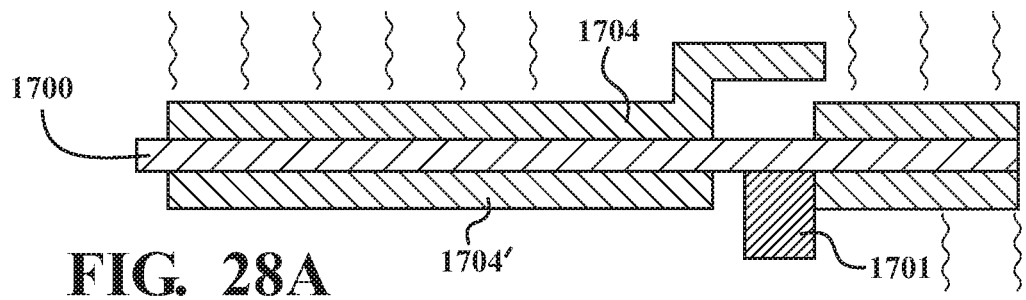
FIGS. 28A-28E show another method of forming a component in accordance with another aspect of the disclosure and illustrated with cross-sectional views taken through a wall of one of the various components constructed in accordance with the disclosure.
Figure 28B:
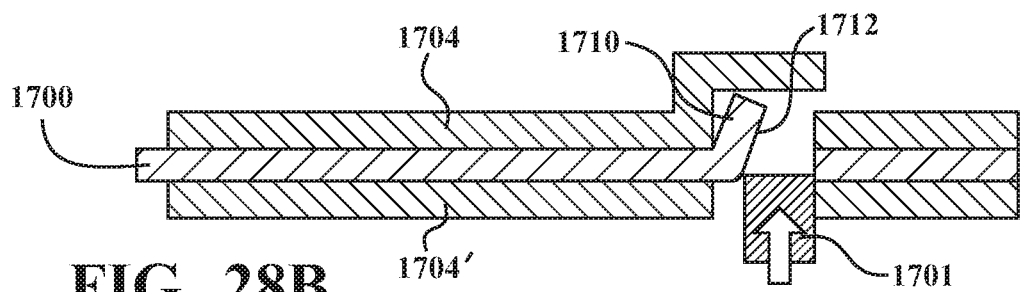
Figure 28C:
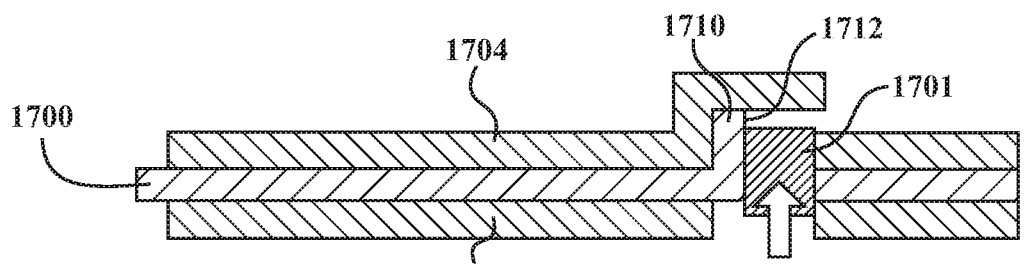
Figure 28D:
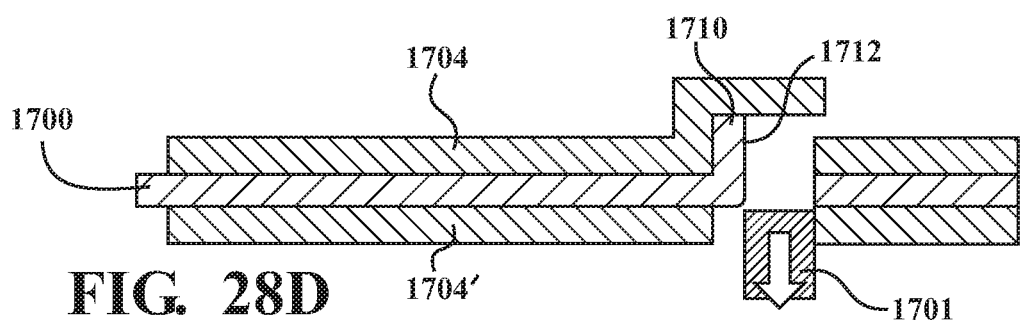
Figure 28E:

As best shown in FIGS. 28A-28E, a method of forming a component (e.g. reaction shell 700, 800, 800', 900) may include a series of hot forming steps in which the punch member 1701 is removed to form a feature such as tab hole 1712. Such a method may be used when it is desired to bend the ultra-high strength steel to the chosen geometry (e.g. forming a tab hole 1712). FIGS. 28A-28E show, for example, a cross-section of the first reaction shell 700 shown in FIG. 17. The method begins with heating a component blank 1700 or unfinished shape component (e.g. predetermined tubular shape) in a forming tool, including inner and outer tooling members 1704, 1704' (FIG. 28A), wherein the inner and outer tooling members 1704, 1704' are moveable relative to one another, as discussed above, such that they both may be moveable or either one may remain stationary, with the other being moveable. According to an aspect of the disclosure, the blank 1700 is heated to approximately 900 degrees Celsius. Next, forming a tab hole 1712 into unfinished shape component 1700 by turning an edge into a tab face 1710 by pressing a punch member 1701 through and shearing one side of the unfinished part 1700 (FIG. 28B). The forming occurs while the unfinished shape component 1700 is hot. As shown in FIG. 28C, the method proceeds with completing the forming of the tab hole 1712 by completely following through with the punch member 1701. The next steps of the method is removing the punch member 1701 and quenching the unfinished shape component 1700 and retaining the tooling 1704, 1704' in contact with the blank 1700 (FIG. 28D). The final part 1708 is best shown in FIG. 28E.

It should be appreciated that the views illustrated in FIGS. 21A-28E, only depict a cross-section of a portion of a cylindrical part (e.g. the reaction shell 700, 800, 800', 900). It should be appreciated that each of the method steps illustrated, the punch member and tooling member geometry is generically shown as sharp edges, but may include a radius rather than a sharp edge. It should also be understood that while the steps may be carried out with part of a tubular shape, the method may also be used for other parts of components, such as those described herein, or having other general shapes, including flat sheets.

Figure 29A:
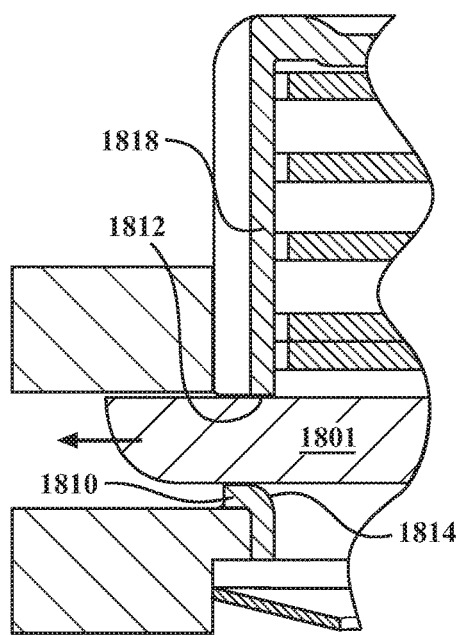
FIG. 29A is a partial cross-sectional view of a clutch housing constructed in accordance with the disclosure.
Figure 29B:
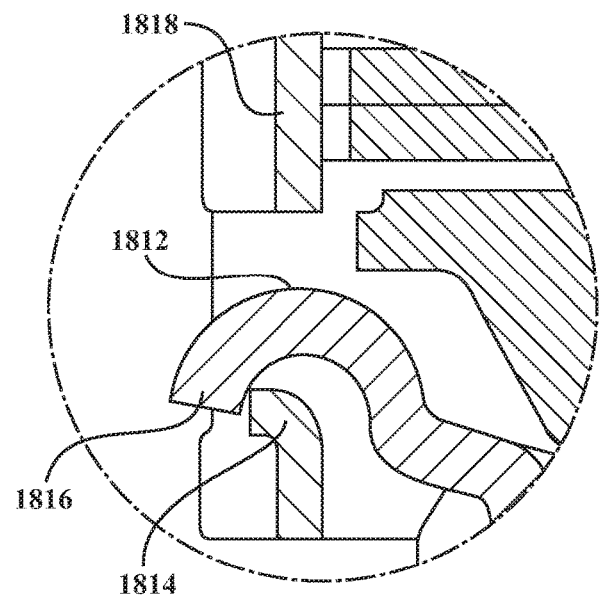
FIG. 29B is an enlarged partial cross-sectional view of the clutch housing of FIG. 29A and illustrating a clutch apply lever.
Figure 29C:
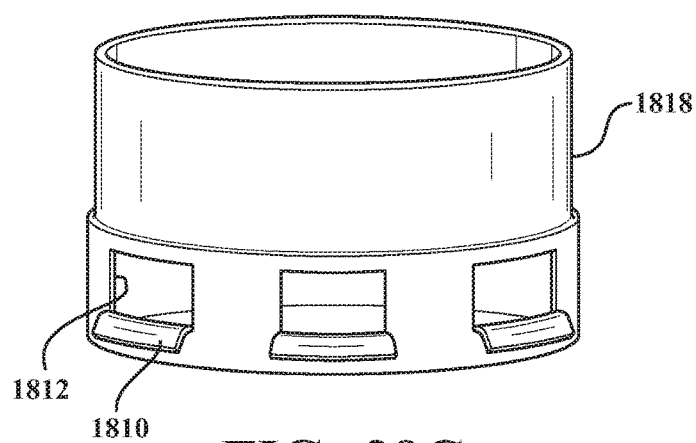
FIG. 29C is a perspective view of the clutch housing of FIG. 29A.
Figure 29D:
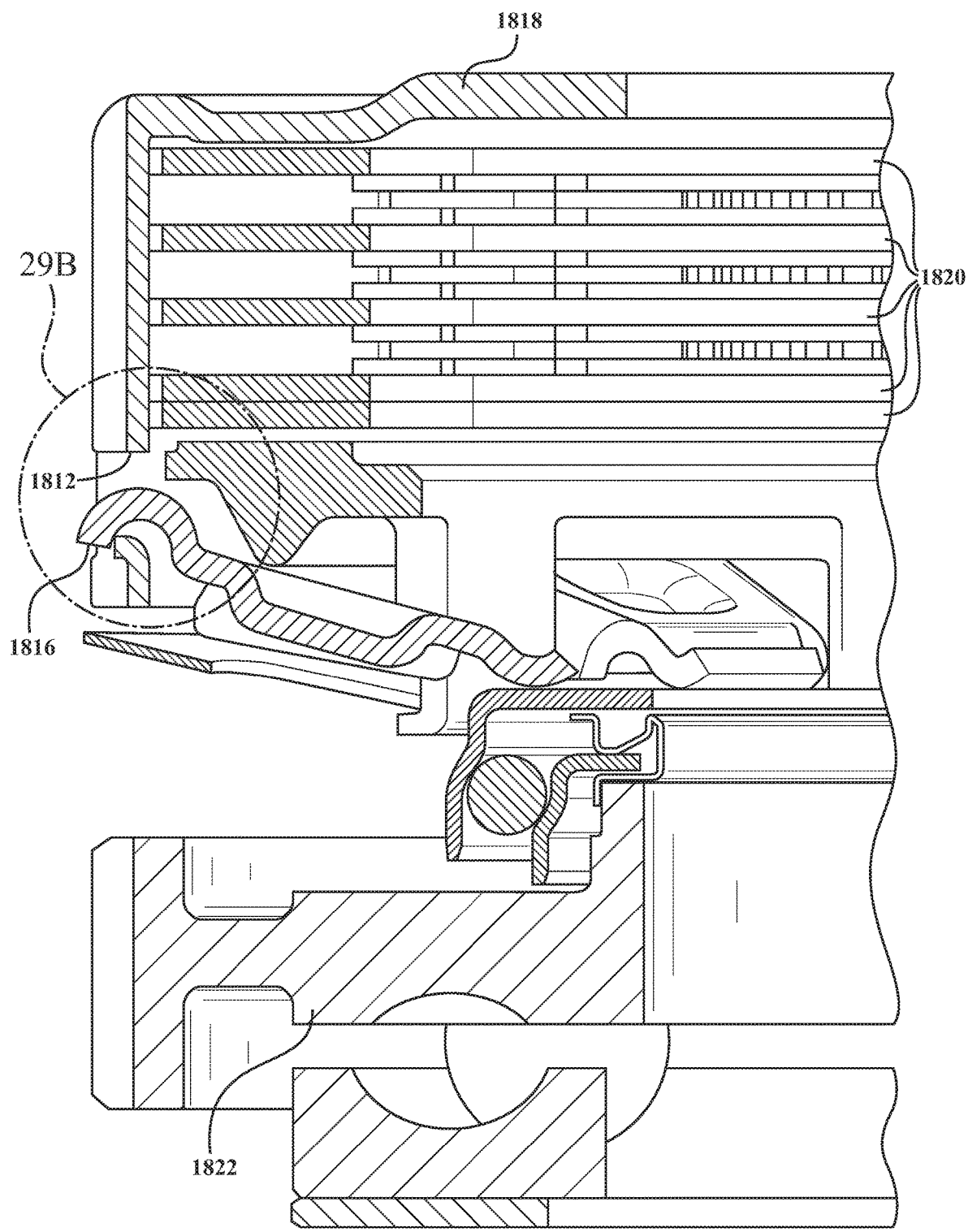
FIG. 29D is a partial cross-sectional view of the clutch housing of FIG. 29A illustrating a plurality of clutch plates, clutch apply lever, and clutch ball ramp disposed within the clutch housing.

An example of a hot form tab hole 1812 application as disclosed herein is illustrated by FIGS. 29A-29D. Specifically, FIG. 29A shows a punch member 1801 piercing to form a tab hole 1812 with a radius 1814 (FIG. 29B) rather than a sharp edge. Such a radius 1814 may be useful to act as a fulcrum, for example, for a clutch apply lever 1816 (FIG. 29B). FIG. 29C illustrates a clutch drum assembly 1818 in which such a tab hole 1812 may be utilized. FIG. 29D shows a cross-section of the clutch drum assembly 1818 shown in FIG. 29C and illustrates the clutch apply lever 1816. Specifically, the clutch housing assembly 1818 may contain clutch plates 1820, the clutch apply lever 1816, and a clutch ball ramp 1822. The hot form tab hole 1812 that is advantageously formed by methods described herein may be engaged by the clutch apply lever 1816, for example.

In each embodiment of the present disclosure, the components may be formed from 22MnB5 steel, however, it should be understood that the amount of boron (B5-B50) may be selected depending on the type of component or strength desired. Additionally, the amount of other materials which comprise the ultra-high strength steel, such as carbon, may cause variation in the martensitic percentage and hardness after quenching. During the heat treatment, the heating temperature may be approximately 850-950 degrees C. More specifically, the target heating temperature for 22MnB5 steel is 900 degrees C., however, the heating temperature may be increased as the amount of boron is increased. As described above, the heat treating may be partially or completely localized. The heating method may be induction or by other techniques. When it is desirable to localize strength in one particular area of a component, the heat treatment may be localized to that area. In other instances, localized heat treatment may be used for sections of a component having a thicker cross section.

During the quenching step that may be used in forming each embodiment of the present disclosure, the quench press/die (inner and outer tooling members, in combination with the punch members) define the final shape of the part. The release temperature may range between approximately 150-250 degrees C., with a preferred target temperature of 200 degrees C. The components generally remain in the quench press/die (between the inner and outer tooling members) for approximately 6-20 seconds depending on the cross sectional thickness and desired strength.

In general, materials having a strength of approximately 1000 MPa will crack or spring back during cold forming, therefore the methods described in the present disclosure are advantageous when forming such high strength materials. Additionally, due to a reduction of cross section, the geometry of components formed with heat assisted calibration (HAC) methods disclosed herein may be more complex (e.g. ribs). Consequently, the manufacturing of some components (e.g. planetary carrier described in the fifth embodiment above) that may not be possible using cold forming is made possible with HAC processes described herein.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the components in use or operation in addition to the orientation depicted in the figures. For example, if the component in the figures is turned over, elements described as "below" or "beneath" other elements or features would then be oriented "above" the other elements or features. Thus, the example term "below" can encompass both an orientation of above and below. The component may be otherwise oriented (rotated degrees or at other orientations) and the spatially relative descriptions used herein interpreted accordingly.

Many modifications and variations of the present disclosure and invention directed thereto are possible in light of the above teachings. It is, therefore, to be understood that the invention may be practiced otherwise than as specifically described and illustrated, and that the scope of the invention is defined by the claims.

What is claimed is:

1. A method for forming a component utilizing ultra-high strength steel including the steps of:
   providing a blank of ultra-high strength steel;
   cold forming the blank into an unfinished component, wherein the unfinished component has a predetermined tubular shape;
   heating the unfinished component;
   after cold forming the flat blank into an unfinished component, moving an inner tooling member and an outer tooling member relative to one another in a direction transverse to a central axis of the predetermined tubular shape to sandwich and hold the heated component therebetween by pressing the unfinished component between the tooling members, wherein the inner tooling member is disposed within a tubular wall portion of the unfinished component and the outer tooling member is disposed outside of the tubular wall portion;

while the component is sandwiched and held between the inner and outer tooling members and after heating the unfinished component, moving a punch member in a direction transverse to the central axis from a withdrawn, unactuated position to an extended, actuated position to contact the component while sandwiched and held between the inner and outer tooling members to form a feature including at least one of a thickened region having an increased thickness relative to an adjacent region, a recessed annular groove, a recessed pocket, a through hole, a flange, a through hole having a tab extending outwardly therefrom, or spline teeth; and quenching the feature.

2. The method as set forth in claim 1, further including maintaining the inner tooling member in a stationary position and moving the outer tooling member from a withdrawn, unactuated position to an extended, actuated position to sandwich the heated component therebetween.

3. The method as set forth in claim 2, further including moving the punch member from the extended, actuated position back to the withdrawn, unactuated position prior to quenching the feature.

4. The method as set forth in claim 2, further including quenching the feature while the punch member is in the extended, actuated position.

5. The method as set forth in claim 1, further including maintaining the outer tooling member in a stationary position and moving the inner tooling member from a withdrawn, unactuated position to an extended, actuated position to sandwich the heated component therebetween.

6. The method as set forth in claim 5, further including moving the punch member from the extended, actuated position back to the withdrawn, unactuated position prior to quenching the feature.

7. The method as set forth in claim 5, further including quenching the feature while the punch member is in the extended, actuated position.

8. The method as set forth in claim 1, further including moving the inner and outer tooling members from a withdrawn, unactuated position to an extended, actuated position to sandwich the heated component therebetween.

9. The method as set forth in claim 1, further including heating the unfinished component in an inert atmosphere between 850 degrees Celsius and 950 degrees Celsius.

10. The method as set forth in claim 1, further including quenching the feature to a temperature between 150 degrees Celsius and 250 degrees Celsius.

11. The method as set forth in claim 1, wherein the flat blank of ultra-high strength steel is provided of the 22MnB5 ultra high strength steel type.

12. The method as set forth in claim 1, further including forming the component as a clutch housing cylindrical shape having a radial ring portion and a cylindrical drum portion and forming a plurality of spline teeth in the cylindrical drum portion of the clutch housing using the inner and outer tooling members while forming the finished shape.

13. The method as set forth in claim 1, further including forming the component as a clutch hub having a radial ring portion and a cylindrical drum portion and including a tubular neck and forming a plurality of generally triangular openings in the radial ring portion of the unfinished shape and forming a plurality of spline teeth in the cylindrical drum portion of the clutch hub using the inner and outer tooling members while forming the finished shape and attaching a drive gear to the tubular neck.

14. The method as set forth in claim 1, further including forming the component as a a CVT plunger and forming the unfinished shape with a thick center and a thick outer edge and forming the finished shape of a generally bell-shaped body defining a centrally disposed opening with the quenching die.

15. The method as set forth in claim 1, further including forming the component as a CVT cylinder having a first end and a second end and a shoulder formed at the first end and an opening longitudinally extending from the first end to the second end.

16. The method as set forth in claim 1, further including forming the component as a planetary gear carrier having a first piece and a second piece and forming the first piece into the unfinished shape with a plurality of apertures circumferentially disposed in a spaced relationship about the first piece and including a plurality of legs extending longitudinally and forming the second piece into the unfinished shape with a plurality of apertures circumferentially disposed in a spaced relationship about the second piece and joining the first piece with the second piece after forming the finished shape of the first piece and the finished shape of the second piece using the inner and outer tooling members.

17. The method as set forth in claim 1, further including forming the component as a reaction shell having a cylindrical first portion of a first diameter and a cylindrical second portion of a second diameter being larger than the first diameter and forming a plurality of bores in the cylindrical first portion and in the cylindrical second portion and forming a plurality of radially outwardly extending spline teeth in the cylindrical second portion of the reaction shell using the inner and outer tooling members while forming the finished shape.

18. The method as set forth in claim 1, further including forming the component as a differential housing having a drum shape with a tubular neck portion defining a central opening and including a plurality of arms extending radially and longitudinally from the neck portion and wherein the arms alternate circumferentially between the arm including a radially inwardly extending shoulder and the arm having a generally L-shaped cross section and forming at least one aperture in each of the arms.

19. The method as set forth in claim 1, further including forming the component as a differential cover for enclosing a plurality of pinion gears having a bell shaped body extending between a generally cylindrical first end and an opposite annular second end and attaching a ring gear to the tubular neck following forming the finished shape using the inner and outer tooling members.

20. The method as set forth in claim 1, further including forming the component as a torque converter cover having a front portion with a general drum shape including a radial wall having an outer peripheral portion defining a lock-up surface and an integral cylindrical portion having an inner surface extending longitudinally from the radial wall and a back portion having a ring shape with a center opening and a curved cross section and forming a plurality of spline teeth in the inner surface of the front portion using the inner and outer tooling members while forming the finished shape of the front portion.

21. The method as set forth in claim 1, wherein the step of forming the blank into an unfinished component includes cold-forming a flat blank into a non-flat shape.

\* \* \* \* \*